US012603915B1

(12) United States Patent
Sharma et al.

(10) Patent No.: US 12,603,915 B1
(45) Date of Patent: Apr. 14, 2026

---

(54) AGENTIC ON-DEVICE ADAPTATION FOR INCREASING NODE EFFICIENCY BY ACCOMMODATING DISTRIBUTION SHIFTS

(71) Applicant: U.S. Bancorp, National Association, Minneapolis, MN (US)

(72) Inventors: Rahul Sharma, Fremont, CA (US); Narasimha 'Murthy' M Kunchakarra, Fremont, CA (US)

(73) Assignee: U.S. Bancorp, National Association, Minneapolis, MN (US)

( * ) Notice: Subject to any disclaimer, the term of this patent is extended or adjusted under 35 U.S.C. 154(b) by 0 days.

(21) Appl. No.: 19/285,707

(22) Filed: Jul. 30, 2025

Related U.S. Application Data

(63) Continuation of application No. 19/200,467, filed on May 6, 2025, now Pat. No. 12,401,680.

(51) Int. Cl.
G06F 40/30 (2020.01)
H04L 9/40 (2022.01)

(52) U.S. Cl.
CPC .......... H04L 63/1433 (2013.01); G06F 40/30 (2020.01)

(58) Field of Classification Search
CPC .... G06F 40/211; G06F 40/253; G06F 40/268; G06F 40/284; G06F 40/30; G06N 3/08
See application file for complete search history.

(56) References Cited

U.S. PATENT DOCUMENTS

| | | | | |
|---|---|---|---|---|
| 6,507,012 | B1 * | 1/2003 | Medard | H04B 10/85 356/73.1 |
| 9,558,677 | B2 * | 1/2017 | Sadeh-Koniecpol .. | G09B 19/00 |

| | | | | |
|---|---|---|---|---|
| 9,824,609 | B2 * | 11/2017 | Sadeh-Koniecpol | H04L 63/1425 |
| 10,681,072 | B2 * | 6/2020 | Alfano | H04L 43/0876 |
| 11,128,655 | B2 * | 9/2021 | S | G06F 21/552 |
| 11,503,063 | B2 * | 11/2022 | Rao | H04L 63/1416 |
| 11,757,871 | B1 * | 9/2023 | Shah | H04M 1/72463 455/411 |
| 11,830,357 | B1 * | 11/2023 | Murphy | G08G 1/096716 |
| 12,069,083 | B2 * | 8/2024 | Hawthorn | H04L 63/1433 |
| 12,141,289 | B1 * | 11/2024 | McDonald | H04L 63/0263 |
| 12,299,133 | B2 * | 5/2025 | Yellapragada | H04L 63/1416 |
| 12,321,446 | B1 * | 6/2025 | Chan | G06F 21/55 |
| 12,335,296 | B2 * | 6/2025 | Binyamini | G06N 5/022 |
| 12,437,062 | B1 * | 10/2025 | Naidoo | G06N 3/08 |
| 12,524,329 | B2 * | 1/2026 | Sheriff | G06F 11/3636 |
| 2014/0199663 | A1 * | 7/2014 | Sadeh-Koniecpol | H04L 63/1408 434/118 |
| 2014/0199664 | A1 * | 7/2014 | Sadeh-Koniecpol | G06F 21/564 434/118 |
| 2015/0220311 | A1 * | 8/2015 | Salter | G06F 8/34 717/105 |

(Continued)

FOREIGN PATENT DOCUMENTS

| | | | | |
|---|---|---|---|---|
| WO | WO-2022041980 A1 * | 3/2022 | ......... | G06F 16/3329 |

*Primary Examiner* — Lamont M Spooner

(74) *Attorney, Agent, or Firm* — FOLEY & LARDNER LLP

(57) ABSTRACT

A method and related systems for dynamically adjusting on-device configurations for models based on detected context switches is disclosed. The system can use an on-device language model to determine context parameters in a first mode and then uses the context parameters to determine prediction models or prediction model parameters to use for inputs provided in a second mode.

20 Claims, 8 Drawing Sheets

600

Determine Association Between First Context Parameter Of First Mode And First Prediction Model Of Second Mode 602

Determine First Context Parameter From First Data Using Language Model Via First Model 604

Receive Second Input For Prediction Model Via Second Mode 608

Determine First Prediction Model Based On Association Between First Context Parameter And First Prediction Model 612

Generate Output Prediction Indicating Message Type By Providing Prediction Model With Second Input 618

Present Message Of The Message Type 620

Transmit Prediction Model To Second Device 622

(56) References Cited

U.S. PATENT DOCUMENTS

| | | | |
|---|---|---|---|
| 2015/0373132 A1 | 12/2015 | Mukherji et al. | |
| 2017/0103674 A1* | 4/2017 | Sadeh-Koniecpol | ........................ G06F 21/566 |
| 2017/0235960 A1* | 8/2017 | Austin | ................... G06N 20/00 726/25 |
| 2018/0198872 A1* | 7/2018 | Wang | ................... G06F 16/245 |
| 2018/0330102 A1* | 11/2018 | Siman | ................. G06F 16/2433 |
| 2019/0108330 A1* | 4/2019 | Sikder | ..................... G06F 21/44 |
| 2019/0236450 A1* | 8/2019 | Li | ............................. G06N 3/08 |
| 2019/0325080 A1 | 10/2019 | Natarajan et al. | |
| 2020/0020326 A1 | 1/2020 | Srinivasan et al. | |
| 2020/0059468 A1* | 2/2020 | Wolosewicz | ............ G06F 21/42 |
| 2020/0067861 A1* | 2/2020 | Leddy | ................. G06F 21/6245 |
| 2020/0175174 A1* | 6/2020 | Bakalli | ...................... G06F 8/71 |
| 2020/0184053 A1* | 6/2020 | Kursun | ................. G06N 3/094 |
| 2020/0409432 A1* | 12/2020 | Mehandjiysky | ........ G06F 21/83 |
| 2021/0021592 A1* | 1/2021 | Wright | ................... G06F 21/32 |
| 2021/0166080 A1* | 6/2021 | Podder | ................. G06F 18/217 |
| 2021/0194883 A1* | 6/2021 | Badhwar | .............. H04L 63/107 |
| 2021/0209226 A1* | 7/2021 | Sundararajan | ........ G06F 21/562 |
| 2021/0319093 A1* | 10/2021 | Molloy | ................. G06N 3/045 |
| 2021/0360007 A1* | 11/2021 | Paquin | .................... G06N 3/09 |
| 2021/0362427 A1* | 11/2021 | Gonzalez Martin | .... G06T 17/20 |
| 2022/0046048 A1* | 2/2022 | Koo | ................... H04L 63/1433 |
| 2022/0060501 A1* | 2/2022 | Liu | ....................... G06F 21/554 |
| 2022/0109753 A1* | 4/2022 | Baror | ............... H04M 3/42068 |
| 2022/0164471 A1* | 5/2022 | Braghin | ............... G06F 16/213 |
| 2022/0197923 A1* | 6/2022 | Jeong | ..................... G06N 3/045 |
| 2022/0394055 A1* | 12/2022 | Mukkamala | ........ H04L 63/1433 |
| 2022/0405537 A1* | 12/2022 | Yang | ...................... G06N 3/094 |
| 2023/0038196 A1* | 2/2023 | Labreche | .............. G06F 21/577 |
| 2023/0065870 A1* | 3/2023 | Pyzow | ..................... G06N 3/10 |
| 2023/0262507 A1* | 8/2023 | Marquezan | ........... G06F 16/211 709/224 |
| 2023/0344856 A1* | 10/2023 | Mosko | ................ H04L 63/1425 |
| 2023/0367644 A1* | 11/2023 | Marzorati | .............. G06N 20/10 |
| 2023/0412635 A1* | 12/2023 | Binyamini | ............... G06N 5/04 |
| 2023/0421582 A1* | 12/2023 | McCarthy | .......... H04L 63/1425 |
| 2024/0054233 A1* | 2/2024 | Ohayon | .................. G06F 21/54 |
| 2024/0114041 A1* | 4/2024 | Sapountzis | ......... H04L 63/1408 |
| 2024/0249077 A1* | 7/2024 | Chen | ..................... G06F 40/284 |
| 2024/0250979 A1* | 7/2024 | Ding | ...................... G06N 20/00 |
| 2024/0330934 A1* | 10/2024 | Karimli | ............. H04W 12/121 |
| 2024/0333746 A1* | 10/2024 | Williams | ........... G06F 11/3624 |
| 2024/0340302 A1* | 10/2024 | Wang | .................... G06N 20/00 |
| 2024/0363125 A1* | 10/2024 | Khoury | .................. G10L 17/08 |
| 2024/0370703 A1* | 11/2024 | Sikka | ..................... G06F 40/30 |
| 2024/0411666 A1* | 12/2024 | Chan | .................. G06F 11/3624 |
| 2024/0412720 A1* | 12/2024 | Vasylyev | .......... G06F 16/90332 |
| 2025/0013744 A1* | 1/2025 | Xiao | ...................... G06F 21/554 |
| 2025/0045304 A1* | 2/2025 | Quatro | ................... G06N 20/00 |
| 2025/0071040 A1* | 2/2025 | Wang | ..................... G16Y 40/50 |
| 2025/0156707 A1* | 5/2025 | Hwang | ................... G06N 3/09 |
| 2025/0165616 A1* | 5/2025 | Cameron | .............. G06F 21/552 |
| 2025/0175456 A1* | 5/2025 | Crabtree | .............. G06F 16/909 |
| 2025/0190460 A1* | 6/2025 | Madisetti | ........... G06F 16/3329 |
| 2025/0209156 A1* | 6/2025 | Sankaran | ........... G06F 21/554 |
| 2025/0321759 A1* | 10/2025 | Takamine | .............. G06F 9/451 |
| 2025/0322000 A1* | 10/2025 | Takamine | .......... G06F 16/3344 |
| 2026/0017128 A1* | 1/2026 | Yabusaki | ........... G06F 11/0778 |
| 2026/0017301 A1* | 1/2026 | Vieri | ................... G06F 16/3344 |
| 2026/0037236 A1* | 2/2026 | Sachdev | ................. G06F 8/36 |

* cited by examiner

600

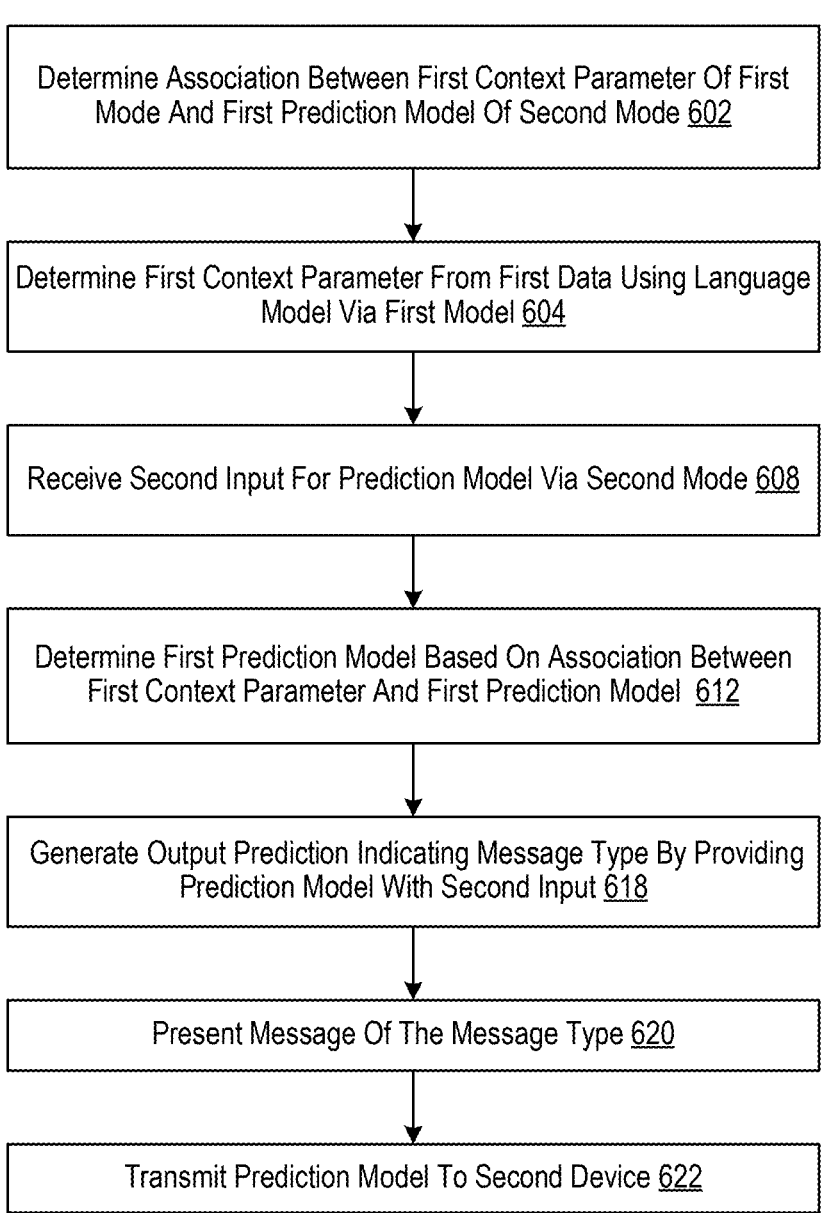

Determine Association Between First Context Parameter Of First Mode And First Prediction Model Of Second Mode 602

Determine First Context Parameter From First Data Using Language Model Via First Model 604

Receive Second Input For Prediction Model Via Second Mode 608

Determine First Prediction Model Based On Association Between First Context Parameter And First Prediction Model  612

Generate Output Prediction Indicating Message Type By Providing Prediction Model With Second Input 618

Present Message Of The Message Type 620

Transmit Prediction Model To Second Device 622

FIG. 6

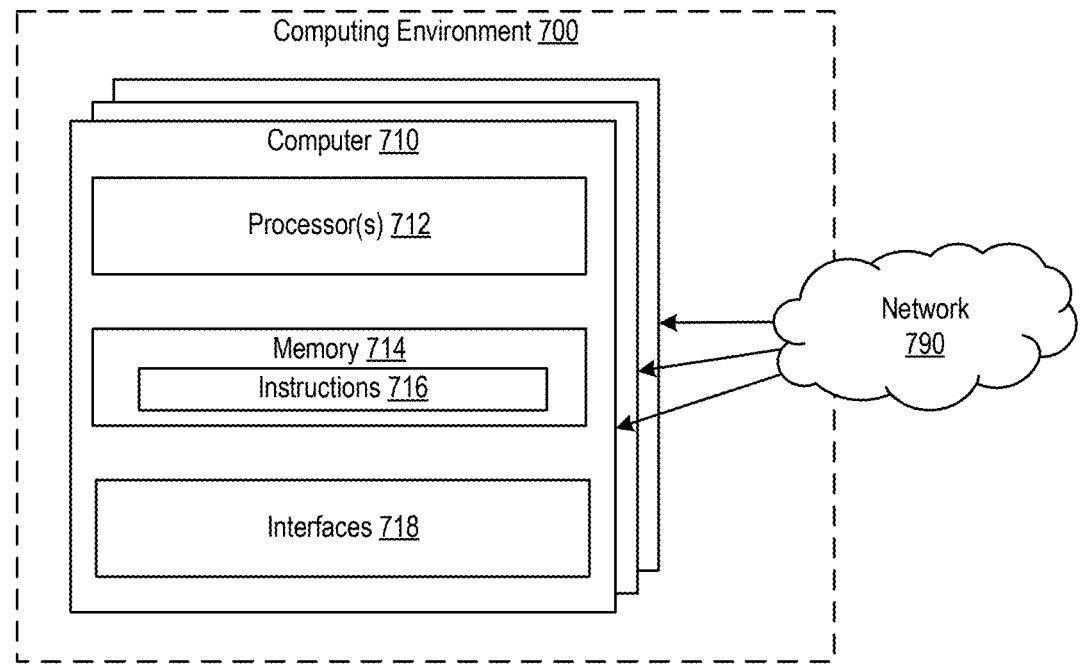
FIG. 7

AGENTIC ON-DEVICE ADAPTATION FOR INCREASING NODE EFFICIENCY BY ACCOMMODATING DISTRIBUTION SHIFTS

CROSS-REFERENCE TO RELATED APPLICATION(S)

This application claims the right and benefit of priority as a continuation of U.S. patent application Ser. No. 19/200, 467, filed May 6, 2025, the entire disclosure of which is incorporated herein by reference in its entirety and for all purposes.

BACKGROUND

Modern network security employs multifactorial defenses combining various protective measures to guard against evolving threats while acknowledging no single security measure provides complete protection. The layered approach reduces vulnerabilities by ensuring breaches in one security layer do not compromise entire systems. Language models may contribute to security operations by analyzing patterns, monitoring data, and identifying potential threats that might otherwise go undetected.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 6 illustrates an example flowchart of a process for detecting drift over multiple modes and modifying prediction models based on the detected drift, in accordance with an implementation.

FIG. 7 discloses a computing environment in which aspects of the present disclosure may be implemented.

FIG. 8 illustrates an example machine learning framework that techniques described herein may benefit from.

DETAILED DESCRIPTION

Figure 1:
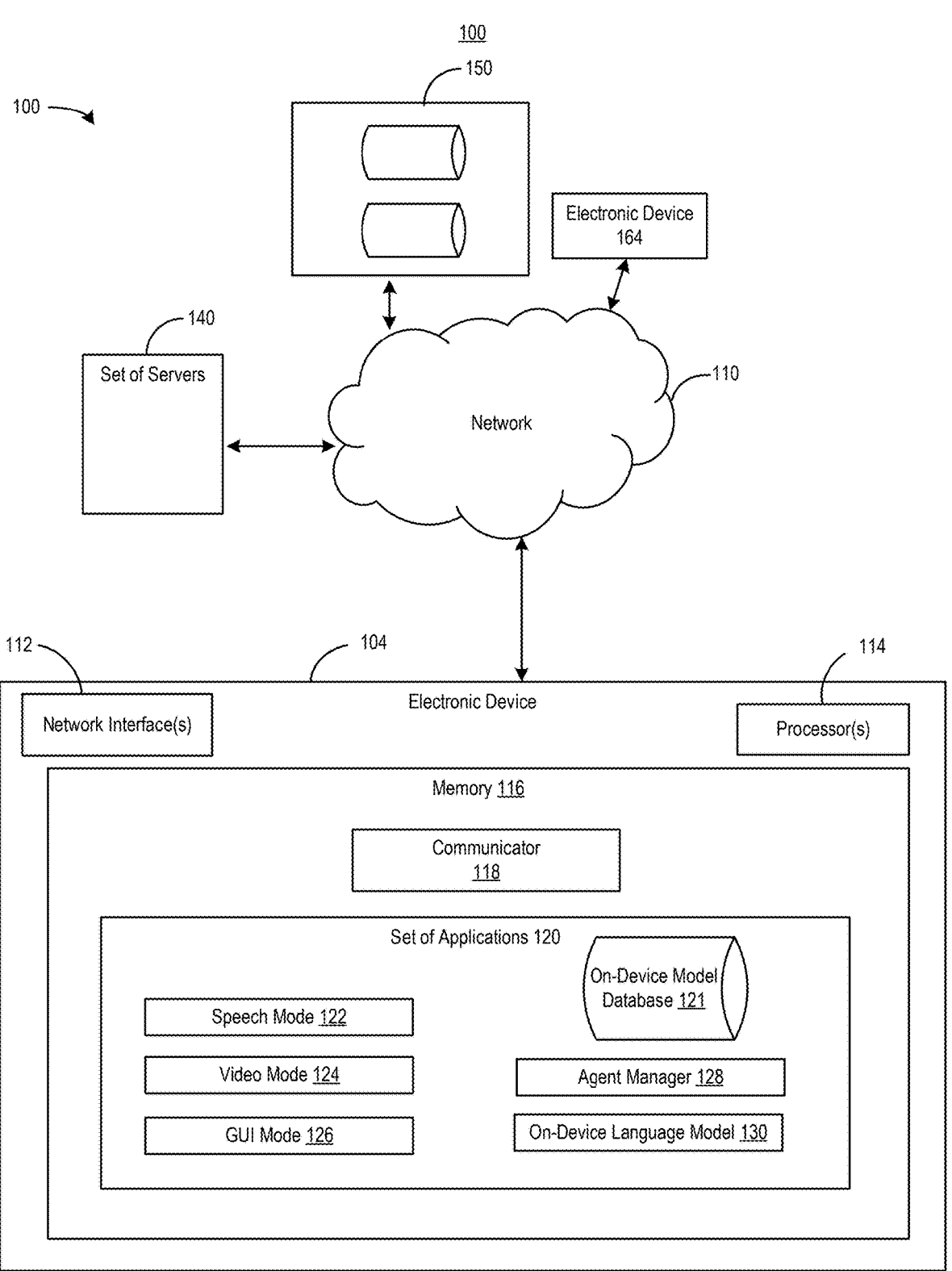
FIG. 1 is an illustration of an example conceptual diagram for a network to detect and spread multi-modal models, in accordance with an implementation.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Though machine learning systems may increase the security afforded by multimodal operations for networked devices and other electronic devices, the conventional use of such systems have drawbacks. Conventional security infrastructure may rely on resource-intensive, data-heavy training and sporadic (often reactionary) updates, which proves inefficient, delayed, and fragile—particularly in evolving landscapes. In these dynamic environments, traditional system retraining or patching approaches may not only fail to improve protection but can actively undermine security, compromising defensive capabilities precisely when organizations most need robust, contextualized protection.

Some embodiments may determine a context parameter based on text input derived from audio data received via an on-device audio receiver of the first electronic device. For example, a computer system may analyze audio data captured by a microphone to extract relevant text and identify context parameters that can be used for further processing. Some embodiments may receive user-provided input for a prediction model via a text-based entry on a user interface screen of the first electronic device. This approach allows the system to dynamically adjust configurations based on detected context switches in an audio mode or another mode different from the mode for which the prediction model is applicable. Such operations may enhance the accuracy of the prediction model used to perform downstream operations based on user interface inputs by considering the context parameters assigned to previously unrelated audio data.

Some embodiments may generate a first output prediction, such as a prediction indicating message vulnerability for a message type, by selecting a prediction model in lieu of a second prediction model based on a map associating the context parameter with the prediction model. For example, a computer system may use a map that links context parameters to specific prediction models, allowing it to choose the most appropriate model for the given context. This can help the system generate more accurate predictions and improve its overall performance. Some embodiments may present a test message of the message type on a display of the first electronic device. This approach allows the system to dynamically adjust configurations based on detected context switches in an audio mode. Some embodiments may further present a test message of the message type on a display of the first electronic device. By presenting the test message and then determining a user or device response to receiving the test message, such embodiments may increase the likelihood of detecting that a device is compromised or that user information is compromised. Furthermore, some embodiments may use the information related to a response or the lack of a response to further refine one or more prediction models.

Some embodiments may transmit a version of the prediction model to a second electronic device in a federated learning network with the first electronic device. For example, a computer system may share the prediction model with other devices in the network to enable collaborative learning and improve the overall performance of the model. This can help the system generate more accurate predictions and enhance its ability to detect message vulnerabilities. Some embodiments may determine a context parameter based on text input derived from audio data received via an on-device audio receiver of the first electronic device. This approach allows the system to distribute prediction models for system security or other operations to other client devices without requiring computationally costly retraining operations for these other devices.

In brief overview, the system 100 can include a set of servers 140, a first electronic device 104, and a second electronic device 164. The set of servers 140 can be configured to store various types of data and perform centralized operations. The set of servers 140 can transmit data to the first electronic device 104 and the first electronic device 104 can execute a large language processing model to receive contextual information regarding the transaction from a user of the first electronic device 104. The first electronic device 104 can transmit the contextual information to the set of servers 140 for storage. The set of servers 140, the first electronic device 104, or the device described in this disclosure can communicate over a network 110. The system 100 may include more, fewer, or different components than shown in FIG. 1.

The set of servers 140, the first electronic device 104 can include or execute on one or more processors or computing devices communicate via the network 110. The network 110 can include computer networks, such as the Internet, local, wide, metro, or other area networks, intranets, satellite networks, and other communication networks, such as voice or data mobile telephone networks. The network 110 can be used to access information resources such as web pages, websites, domain names, or uniform resource locators that can be presented, output, rendered, or displayed on at least one computing device (e.g., the set of servers 140, the first electronic device 104, the second electronic device 164, etc.), such as a laptop, desktop, tablet, personal digital assistant, smartphone, portable computers, or speaker.

The set of servers 140, the first electronic device 104, the second electronic device 164, or other computer devices described in this disclosure can include or utilize at least one processing unit or other logic devices, such as a programmable logic array engine or a module configured to communicate with one another or other resources or databases to perform one or more of the operations described in this disclosure. As described herein, computers can be described as computers, computing devices, or client devices. The set of servers 140, the first electronic device 104, the second electronic device 164, or other computer devices described in this disclosure may each contain a processor and a memory. The components of set of servers 140, the first electronic device 104, the second electronic device 164, or other computer devices described in this disclosure can be separate components or a single component. The system 100 and its components can include hardware elements, such as one or more processors, logic devices, or circuits.

The first electronic device 104 may include one or more processors that are configured to provide a set of interfaces that a user can use to add contextual data for a transaction to a record of transaction data that the set of servers 140 stores for the transaction. The first electronic device 104 may comprise a network interface 112, a processor 114, and/or memory 116. The first electronic device 104 may communicate with the set of servers 140 via the network interface 112, which may be or include an antenna or other network device that enables communication across a network and/or with other devices. The processor 114 may be or include an ASIC, one or more FPGAs, a DSP, circuits containing one or more processing components, circuitry for supporting a microprocessor, a group of processing components, or other suitable electronic processing components. In some embodiments, the processor 114 may execute computer code or modules (e.g., executable code, object code, source code, script code, machine code, etc.) stored in memory 116 to facilitate the operations described herein. The memory 116 may be any volatile or non-volatile computer-readable storage medium capable of storing data or computer code.

The processor 114 can activate the set of applications 120 or perform other operations described in this disclosure. The processor 114 can activate the set of applications 120 in response to receiving the message from the set of servers 140 (e.g., a message indicating a database transaction). For example, the first electronic device 104 can receive the message containing database transaction data for a database transaction through the communicator 118. In response to receiving the message, the processor 114 can activate (e.g., open) the set of applications 120 to access a user interface provided by the set of applications 120.

The memory 116 may include a communicator 118 and/or a set of applications 120. In brief overview, the set of applications 120 may cooperate to generate and/or maintain one or more interfaces at a display of the electronic device and/or through which a user can provide voice data. The set of applications 120 can use large language processing techniques to determine responses based on the transaction data of the transaction and, in some cases, account data of an account associated with the user. Upon completing the interaction with the user and collecting contextual information regarding the transaction through the interface(s), the first electronic device 104 can transmit the contextual information to the set of servers 140 to store in a record (e.g., a file, document, table, listing, message, notification, etc.) with the other transaction data of the transaction.

The communicator 118 may comprise programmable instructions that, upon execution, cause the processor 114 to communicate with the set of servers 140 and/or any other computing device. The communicator 118 may be or include an application programming interface (API) that facilitates communication between the first electronic device 104 (e.g., via the network interface 112) and other computing devices. The communicator 118 may communicate with the set of servers 140, the second electronic device 164, a set of databases 150, and/or any other computing device via the network 110. The communicator 118 can establish a connection with a set of servers 140, the second electronic device 164, the set of databases 150, or other computer devices described in this disclosure over the network 110. In one example, the communicator 118 can transmit a syn packet to the set of servers 140 and establish the connection using a TLS handshaking protocol. The communicator 118 can use any handshaking protocol to establish a connection with the set of servers 140.

The set of applications 120 may comprise programmable instructions that, upon execution, cause the processor 114 to generate user interfaces and communicate with a user of the first electronic device 104 through the user interfaces. The set of applications 120 can additionally communicate and/or control other applications stored in the memory 116 of the first electronic device 104. For example, the set of applications 120 can automatically activate a camera application stored in the memory 116 responsive to receiving a request at the chat interface to take a picture. The set of applications 120 can operate or control any applications stored in the memory 116 of the first electronic device 104. The set of applications 120 can include a speech mode component 122, a video mode component 124, graphic user interface (GUI)

mode component 126, an agent manager component 128, and an on-device language model 130.

The speech mode component 122 may comprise programmable instructions that, upon execution, cause the processor 114 to convert audio into text. For example, the user of the first electronic device 104 can speak into a microphone of the electronic device. The microphone can capture the speech as audio data and transmit the audio data to the set of applications 120. The speech mode component 122 can convert speech or other audio data into text, such as by using Fourier transforms and can cluster and classify words of the text.

The video mode component 124 may comprise programmable instructions that, upon execution, cause the processor 114 to convert video data into text. For example, the user of the first electronic device 104 can use a camera of the first electronic device 104 to show a video of themselves speaking or use the communicator 118 to download and store a video into the first electronic device 104. The recorded video data or stored video data may then be provided to the speech mode component 122, which can convert speech or other audio data into text. For example, the speech mode component 122 may use Fourier transforms to characterize sounds and can cluster and classify words of the text.

The GUI mode component 126 may comprise programmable instructions that, upon execution, cause the processor 114 to receive and process inputs with a GUI. For example, the user of the first electronic device 104 can tap on a button, input text, and use a camera of the first electronic device 104. Furthermore, it should be understood that the memory 116 may store other components to obtain input data via other modes, such as haptic data, geolocation data, etc.

In some embodiments, the agent manager component 128 may apply different agents, model wrappers, or even different foundation models to determine context parameters based on inputs provided by the speech mode component 122, the video mode component 124, the GUI mode component 126, or other input mode components. For example, the agent manager component 128 may use an on-device language model 130 executing on the set of servers 140 to determine a context parameter based on audio data received via an on-device audio receiver of the first electronic device 104 and converted into input text by the speech mode component 122. The agent manager component 128 may use the on-device language model 130 by applying a specialized agent module, a language model wrapper, or use the on-device language model 130 directly. The agent manager component 128 may provide the first input to the on-device language model 130 and determine a first context parameter, such as a context parameter indicating an environmental parameter (e.g., "stressed," "rushed," "recession," etc.). The first electronic device 104 may then receive a user-provided input (e.g., a text-based entry) via the GUI mode component 126, where the agent manager component 128 may be configured to apply a prediction model from a plurality of prediction models stored in an on-device model database 121. The agent manager component 128 may determine or select which model stored in the on-device model database 121 to use. For example, a computer system may accept text input from a user through a touchscreen interface that is interpreted by the GUI mode component 126, where the text input is then used as user-provided input for a prediction model selected from models stored in the on-device model database 121.

In some embodiments, the prediction model determined by the agent manager component 128 may generate a first output prediction indicating message vulnerability for one or more message types. For example, the prediction model determined by the agent manager may indicate that a user of the first electronic device 104 is vulnerable to the message type "unprompted verification text." The agent manager component 128 may select a first prediction model instead of one or more other second prediction models based on an associative data structure (e.g., an associative array map, a data table, prefix trees, etc.) associating a context parameter determined using the on-device language model 130. For example, agent manager component 128 may refer to an associative array by using context parameter "param1" as a key and, from the associative array, retrieve an identifier for the on-device model database 121. Alternatively, or additionally, the agent manager component 128 may select model parameters to configure a model selected from the on-device model database 121 (e.g., selecting adapter neural network layers for a neural network model selected from the on-device model database 121). Alternatively, or additionally, the agent manager component 128 may select specific input context parameters or context data to provide to a prediction model that, when included, may alter the user-provided input (e.g., setting an input parameter to "yes" instead of "no.").

The model determined by the agent manager component 128 may generate an output prediction indicating the vulnerability of a message type. In some embodiments, the agent manager component 128 may select a model based on inputs obtained via a first mode and then provide the model with an input obtained via a second mode. The set of servers 140 may receive a request from the first electronic device 104 indicating this output prediction and, in response, send a test message of that message type to the first electronic device 104. The first electronic device 104 may then present, on a display of the first electronic device, a portion of the test message or a visual change prompted by data stored in the test message. For example, a computer system may display a test message "identity deviation detected, please verify through verification step" on a screen.

A user may then interact with the first electronic device 104 to send a response related to this test message back to the first electronic device 104. In some embodiments, an interaction during a later use of the first electronic device 104 may indicate a vulnerability status of the first electronic device 104. For example, the first electronic device 104 may indicate itself as being vulnerable by based on a user interaction with a user interface element (UI element) of a presented test message or another type of target interaction type during or after the presentation of the test message. In some embodiments, the set of servers 140 may send a test message to the first electronic device 104 to detect whether a device is being fraudulently used. For example, the set of servers 140 may send a test message to the first electronic device 104 requesting a verification value (e.g., a user-known identification number). A user's failure to provide the verification value may cause the first electronic device 104 to send a confirmation message back to the set of servers 140 indicating that the data stored on the first electronic device 104 is compromised or is otherwise vulnerable. Alternatively, or additionally, the set of servers 140 may send a test message to the first electronic device 104 to detect whether the user is susceptible to phishing attacks or other types of vulnerabilities based on user interaction. For example, based on a prediction model's output prediction indicating that the use of the first electronic device 104 indicates vulnerability to a fake request for login information, the set of servers 140 may send a request for the user's name and password or for the user to confirm a payment to a bank account. In such cases, a user that interacts with the first electronic device 104 to provide a confirmation message indicating an affirmative response, where such an indication of an affirmative response may indicate vulnerability to hacking or fraud attempts. Furthermore, in some embodiments, the first electronic device 104 may retrieve a message from its own memory and present this message on a display of the first electronic device 104 without receiving any messages from the set of servers 140.

In some embodiments, the first electronic device 104 to share the determined prediction model and data indicating an association between the prediction model and the context parameter detected using the on-device language model 130 with other electronic devices. For example, the first electronic device 104 may transmit a version of a prediction model to the second electronic device 164, where the second electronic device 164 is in a federated learning network with the first electronic device 104. In some embodiments, receiving a message similar to the user-provided input causes the second electronic device 164 to generate a second output prediction indicating message vulnerability for the message type using the prediction model provided by the first electronic device 104. The second electronic device 164 may forego performing its own training operation to use the prediction model from the first electronic device 104 and instead directly use the prediction model from the first electronic device 104 without performing training operations to determine the prediction model. The second electronic device 164 may then provide a user's input to the transferred prediction model to generate a second output prediction and, based the second output prediction, determine that the device is vulnerable to one or more message types. The second electronic device 164 may then present a corresponding set of test messages of the one or more message types to test the device vulnerability of the second electronic device 164. For example, the second electronic device 164 may present a test message "please confirm transfer of $100.00 to acct xyz" based on an output prediction of the second electronic device 164 indicating that a user of the second electronic device 164 is susceptible to such a message.

The on-device language model 130 can be or include a machine learning model (e.g., neural network, a transformer, etc.) that has been trained to output a text sequence to a user interface of the set of applications 120 in response to inputs provided from audio data, video data, data provided via a user interface, or other data. The on-device language model 130 may be or may include a large language model (LLM) or may be in communication with an LLM via an API. In some embodiments, the on-device language model 130 can be trained using few-shot and/or zero-shot learning techniques. In some embodiments, the on-device language model 130 or another language model described in this disclosure can be trained to output responses to inputs regarding data stream data. The on-device language model 130 can output the responses as a string of text to a GUI, as a category or set of data interpretable by another component (e.g., causing an application to highlight a particular button or otherwise visually indicate another portion of a GUI). Alternatively, or additionally, the on-device language model 130 or an application program interface (API).

In some embodiments, the system 100 may provide a framework for the use of real-time, on-device models. In some embodiments, the first electronic device 104 or another set of components of the system 100 may detect emerging contextual signals that indicate a shift in the user's environment or behavior (e.g., a shift in the distribution of metrics indicating environment or device behavior). For example, if a user typically makes decisions based on stable economic conditions, a sudden economic shift, like a recession, might change their decision-making patterns. When such a shift is detected, the first electronic device 104 may employ on-device fine-tuning using meta-learned or few-shot methods, allowing the user's local model to quickly adapt to the new context using few retraining iterations. The adapted model, although trained locally, can serve as an informative prior for other users experiencing similar shifts. For instance, if one user's model adapts to a recession, another user facing the same economic conditions can initialize their model from or blend with the adapted model. Such operations enable connected devices having locally adapted models to act as peers and help each other escape learning traps, such as delayed tuning, overfitting to transient shifts, or sluggish response to regime changes. By identifying and propagating meaningful adaptation patterns across users while preserving on-device autonomy and privacy, the system 100 may achieve faster and more stable adaptation across distributed environments. For example, the first electronic device 104 may identify and propagate context parameter patterns to the second electronic device 164 while preserving on-device autonomy and privacy. Additionally, all learning and inference are performed locally on the user's device, ensuring privacy. Coordination via distributed learning or peer-to-peer transfer is only used for rare, aggregated global updates.

For example, system 100 may be used to provide device security services in an IT environment. Under normal network conditions, the system 100 may enforce a standard set of security protocols—such as routine firewall configurations and regular patch management—to protect devices. However, if an unexpected surge in non-standard activity occurs, like a coordinated cyber-attack or exploitation of a new vulnerability, the system 100 may identify this change through shifts in user-provided queries by assigning context parameters to the queries. The system 100 may then adjust an enforcement protocol for output in a different mode to propose more stringent security measures, such as enhanced encryption, tighter access controls, or dynamic firewall rules. This updated model can subsequently be applied as a baseline for other devices facing similar security threats, enabling them to benefit from the improved defenses without requiring a complete overhaul of their existing security setups.

As another example, the system 100 may be used to implement market information material. For example, under stable economic conditions, the system 100 may recommend large-cap stocks to a user. However, if a sudden economic downturn occurs, the system 100 may detect shifts through changes in the user's interactions and adapt a model accordingly (e.g., detecting a shift in the distribution of measured actions over multiple time periods). This adapted model can then serve as a starting point for other users experiencing similar economic conditions, allowing them to benefit from the prior adaptation without undergoing the same extensive retraining process.

In some embodiments, the system 100 may operate across multiple modalities such as voice, text, video, and images. This framework may use shift signals (i.e., changes in the context parameter assigned to input) detected in one mode to guide model selection, contextual activation, or fine-tuning in another mode. For instance, a user interacting via a voice interface may express emotional cues indicating concern about economic conditions. The voice model, trained to detect such signals, can activate contextual variables, such as "recession worry," that may not be visible in browsing or text data. When the user transitions to a text-based brokerage platform, this context can be used to select a more relevant predictive model, such as one tuned for small-cap stock interest under stress conditions, rather than the user's usual large-cap preferences.

In some embodiments, the framework is powered by the on-device language model 130 or other on-device agentic models or compact LLMs. The on-device language model 130 or other components of the set of applications 120 may manage real-time model switching and contextual reasoning based on user interaction history and derived context parameters. This multi-modal shift alignment mechanism may provide a method of triggering context switches or feature reweights in models adapted for inputs from a first mode, such as text or image-based models, based on signals derived from data obtained via a second mode, such as a shift in emotion or topic detected in voice. In some embodiments, agentic control modules may determine when to switch between fixed models, personalized adapters, or fine-tuned variants; prioritize or defer modalities based on cross-domain evidence of emerging user context; and suppress redundant adaptation when the shift in one domain is already captured by another.

The system 100 may perform one or more operations described in this disclosure to coordinate learning across different modalities, avoid redundant or misaligned adaptations, and select models that are contextually robust to a detected shift. Such operations may improve model performance while reducing instability and unnecessary retraining. By recognizing and using early signals from one domain to adapt behavior in another, the first electronic device 104 or the second electronic device 164 can preemptively align model selection with context parameters indicating user intent or other aspects of user behavior, enhancing the overall robustness and responsiveness of a computer system.

In some embodiments, the system 100 may enhance the stability and efficiency of prediction models by using historical shift-response trajectories across various modalities and models. The first electronic device 104 or another component of the system 100 may use a lightweight, on-device pattern-matching mechanism that tracks how contextual cues—such as emotional tone, topic triggers, or environmental signals—affect user behavior and model performance over time.

By monitoring these cues by categorizing inputs with context parameters, the first electronic device 104 or another component of the system 100 may learn how patterns of context parameters are formed from specific types of shifts. The first electronic device 104 may then use the learned patterns to pre-activate or prioritize contextual features in models that have not yet observed the shift directly. Alternatively, or additionally, the first electronic device 104 may select or stabilize models already fine-tuned for similar contexts or suppress overreaction to transient or noisy changes that do not match the learned shift-response patterns. The first electronic device 104 may capture correlations across contextual parameters and track adaptation outcomes, preventing redundant switching and managing issues like multicollinearity of parameters. As a result, the first electronic device 104 or another component of the system 100 may provide smoother transitions between models and offer more consistent performance across shifts. By using historical shift-response patterns, the system 100 can stabilize future adaptations, reduce volatility in user experience, and make more efficient use of on-device resources.

For example, the first electronic device 104 may use the on-device language model 130 to generate a context parameter indicating potential message vulnerability based on recent user phone call activity. The first electronic device 104 may then use a model that predicts that the device may be stolen with a compromised password and send a message to the set of servers 140 indicating that it may be vulnerable. The set of servers 140 may then send a test message to assess the security posture of the first electronic device 104, such as by sending an authentication message to request an additional password or identifying information. As another example, the first electronic device 104 may determine using the on-device language model 130 to determine sequences of context parameters indicating a sequence of pandemic-related concerns over time detected in voice interactions. The first electronic device 104 may then correlate this sequence with downstream effects, such as an increased interest in discount or small-cap assets.

In some embodiments, the system 100 may recognize or exploit recurring context parameter patterns over time. The first electronic device 104 may use on-device agentic AI modules or small LLMs of the on-device language model 130 to identify and track sequences of recurring context parameters that affect downstream model outputs. These patterns may be tied to seasonality, behavioral rhythms, or predictable state transitions in a user intent space, environmental context parameter space, etc. For example, the first electronic device 104 may detect a pattern where a user's audio inputs are used to derive a first context parameter "device health tracking survey" in January followed by a second context parameter "planning" in February and March. By learning these sequences, the first electronic device 104 may proactively switch between models or fine-tuned variants that are best aligned with the expected context parameter, minimizing the risk of model hallucination or the risk of generating outputs based on outdated or contextually irrelevant assumptions.

In some embodiments, the first electronic device 104 may construct and use temporally grounded agentic logic capable of recognizing, predicting, and responding to predictable user behavior or context parameter recurrence. This time-aware logic may support anticipatory adaptation instead of reactive correction, increasing the likelihood that the first electronic device 104 aligns model selection with known cycles and reduces misalignment in recommendations or other types of outputs during off-pattern intervals. To support these transitions, the first electronic device 104 or another component of the system 100 (e.g., the set of servers 140) may identify stable context parameters and exogenous stable context parameters. Stable context parameters may be or may include features that remain predictive across different shifts, tasks, or user segments. These stable context parameters may serve as anchors for adaptation, enabling cross-domain knowledge transfer from models trained on older data distributions or in related domains. Outputs from models trained to handle particular drifts, as well as those currently experiencing them, can be fed into a meta-adaptive layer that is adjacent to machine learning model layers corresponding with stable context parameters. These meta-adaptive layers may then be used to perform additional fine-tune training operations or to perform model selection during detected shifts in context parameters over time. By performing such operations, the first electronic device 104 or another component of the system 100 may be more resilient to recurring patterns and capable of bootstrapping adaptation to novel conditions more efficiently.

Figure 2:
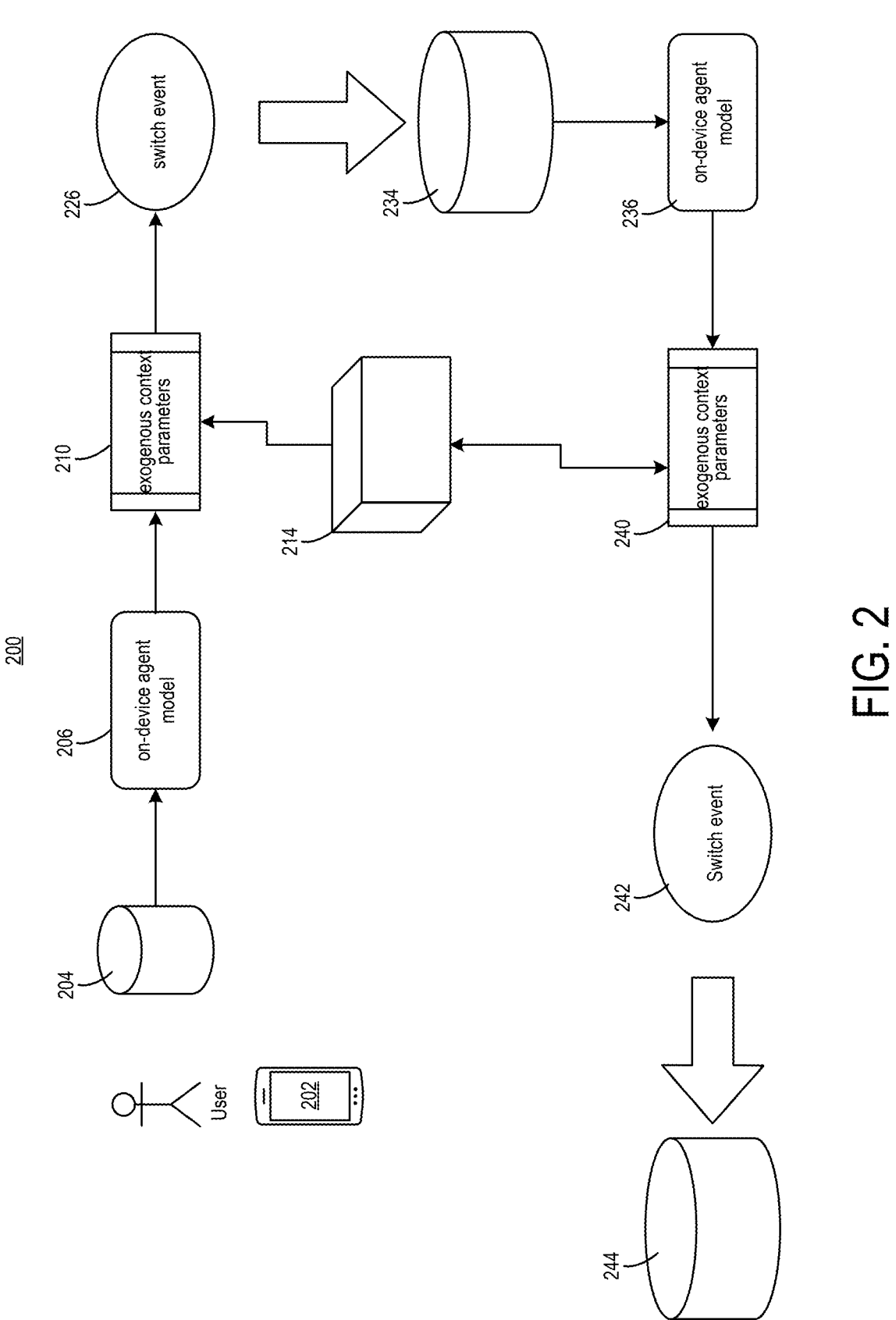
FIG. 2 is an illustration of an example conceptual architecture for detecting context drift switching models in response to the drift, in accordance with an implementation.

FIG. 2 is an illustration of an example conceptual architecture 200 for detecting context drift switching models in response to the drift, in accordance with an implementation. The conceptual architecture 200 includes a user device 202 that stores a first on-device agent model 206, where the first on-device agent model 206 may rely in part on the on-device language model 214. The user device 202 may interpret video input data 204 and extract a first set of exogenous context parameters 210. The user device 202 may then detect a switch event 226 indicating that a user had switched to entering text, during which speech input data 234 is collected. The user device 202 may then select the second on-device agent model 236 from a repository of possible models. The user device 202 may then provide the speech input data 234 to a second on-device agent model 236 as an input to retrieve a second set of exogenous context parameters 240. The user device 202 may then detect a second switch event 242 indicating that a user is providing data via a third mode. The user device 202 may then select a third model 244 based on the second set of exogenous context parameters 240.

Figure 3:
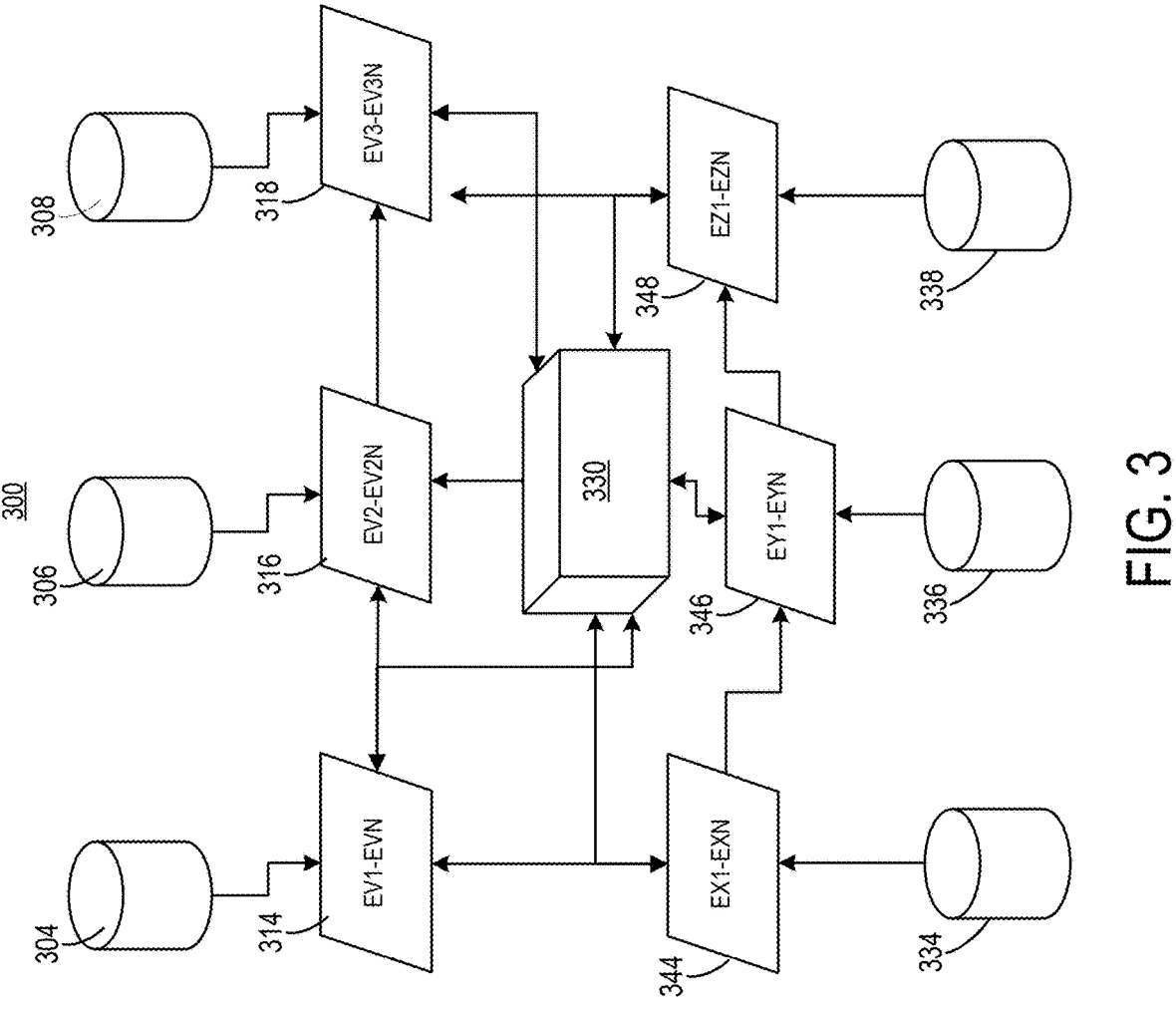
FIG. 3 is an illustration of an example architecture for detecting correlations between different context parameters detected from data obtained via different modes, in accordance with an implementation.

FIG. 3 is an illustration of an example architecture 300 for detecting correlations between different context parameters detected from data obtained via different modes, in accordance with an implementation. The architecture 300 depicts voice input data 304 derived from audio data received with an audio recording device or another electronic device, a video input data 306 derived video data received from a camera or another electronic device, and image input data 308 derived image data received from a camera or another electronic device. The architecture 300 also depicts first input text 334, a second input text 336 derived from more text data, and third input text 338 derived from additional text data, where the text data may be received via a UI or another electronic device API.

Some embodiments may perform operations based on the voice input data 304, the video input data 306, the image input data 308, the first input text 334, the second input text 336, and the third input text 338. For example, some embodiments may use an on-device language model augmented with a wrapper to provide agentic operations to detect a first set of environmental parameters 314 based on the voice input data 304, a second set of environmental parameters 316 based on the video input data 306, and a third set of environmental parameters 318 based on the image input data 308. Additionally, some embodiments may use an on-device language model augmented with a wrapper to provide agentic operations to detect a fourth set of environmental parameters 344 the first input text 334, a fifth set of environmental parameters 346 based on the second input text 336, and a sixth set of environmental parameters 348 based on the third input text 338.

Some embodiments may use an on-device language model 330 to detect relationships between different environmental variables being used as context parameters. For example, the on-device language model 330 may detect co-occurrences of the first set of environmental parameters 314 and the second set of environmental parameters 316 in a same time period or a co-occurrence of the first set of environmental parameters 314 with the fourth set of environmental parameters 344 within a same time period. By detecting associations between two or more parameters of the first set of environmental parameters 314, the second set of environmental parameters 316, the third set of environmental parameters 318, the fourth set of environmental parameters 344, the fifth set of environmental parameters 346, or the sixth set of environmental parameters 348, some embodiments may form multi-modal relationships between models and context parameters by (1) detecting an association between a first context parameter retrieved from data received via a first mode, and a second context parameter retrieved from data received via a second mode, (2) detecting an association between the second context parameter and a prediction model (e.g., a text-based model), and (3) based on the first and second detection operations, associating the first context parameter with the prediction model. As described elsewhere, in some embodiments, a client device may then share this relationship with other client devices, where the other client devices may then be able to form this association between the first context parameter and the prediction model without performing correlation analysis to detect such associations.

Figure 4:
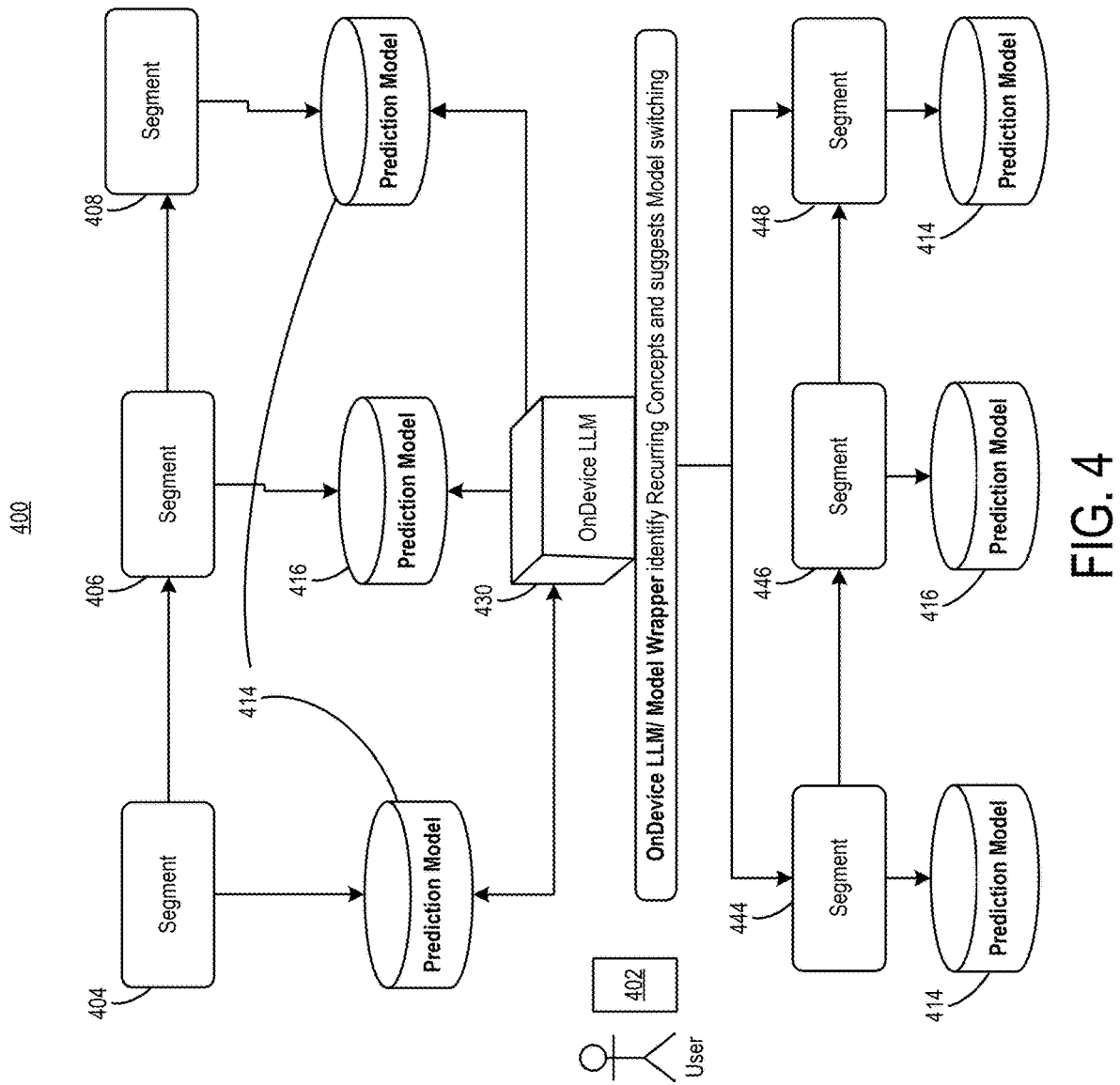
FIG. 4 is an illustration of an example architecture to detect drift and recurring context patterns, in accordance with an implementation.

FIG. 4 is an illustration of an example architecture to detect drift and recurring context patterns, in accordance with an implementation. The architecture 400 for a user electronic device 402 depicts first pattern analysis segment 404 in which a first context parameter is detected, a second pattern analysis segment 406 in which a second context parameter is detected, and third pattern analysis segment 408 in which a third context parameter is detected. During the occurrence of the first pattern analysis segment 404, a user electronic device 402 may use the first prediction model 414 based on training or an associative data structure mapping the first context parameter to the first prediction model 414. During the occurrence of the second pattern analysis segment 406, the user electronic device 402 may use the second prediction model 416 based on training or an associative data structure mapping the second context parameter to the second prediction model 416. During the occurrence of the third pattern analysis segment 408, the user electronic device 402 may use the second prediction model 416 based once more on the training or the data structure mapping the first context parameter to the second prediction model 416.

In some embodiments, the user electronic device 402 may use an on-device language model 430 to detect the pattern of first context parameter, second context parameter, and first context parameter. At a later time, the user electronic device 402 may detect this same pattern emerging and, in response, pre-emptively select models. For example, the user electronic device 402 may detect the occurrence of a previously detect pattern during a period, including the fourth pattern analysis segment 444 (in which the first context parameter is detected), a fifth pattern analysis segment 446 (in which the second context parameter is detected), and a sixth pattern analysis segment 448 (in which the first context parameter is again detected). The user electronic device 402 may detect this pattern and pre-emptively select or determine one or more models for downstream use.

Figure 5:
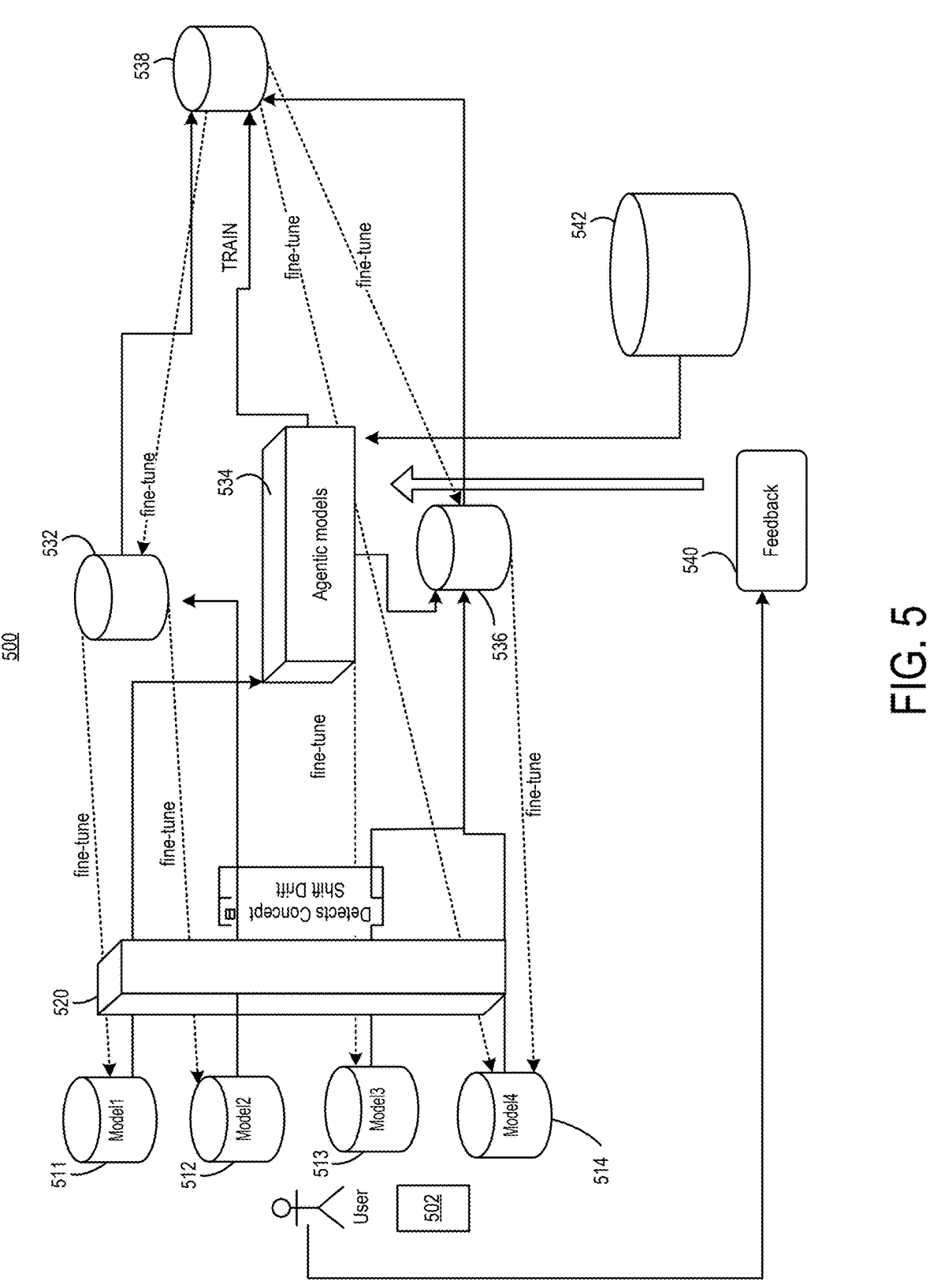
FIG. 5 is an illustration of an example architecture for performing an on-device adaptation of models in multimodal environments, in accordance with an implementation.

FIG. 5 is an illustration of an example architecture 500 for performing an on-device adaptation of models in multi-modal environments, in accordance with an implementation. The architecture 500 shows a first prediction model 511 mapped to a first context parameter, a second prediction model 512 mapped to a second context parameter, a third prediction model 513 mapped to a third context parameter, and a fourth prediction model 514 mapped to a fourth context parameter. The architecture 500 includes a language model stack 520 that includes an on-device large language model, one or more language model wrappers, or one or more agentic models. The language model stack 520 may detect changes in context parameters from one or more inputs and determine which models to use based on detected context parameters or changes in context parameters. In some embodiments, the context parameters or other data obtained using the language model stack 520 may be used as training data for fine-tuning operations or other types of training operations to determine a first prediction model 532 and a second prediction model 536. The first prediction model 532 may be associated with a set of stable context parameters determined to be consistent across multiple periods. The second prediction model 536 may be associated with a set of exogenous context parameters that vary across multiple periods. In some embodiments, a separate set of agentic models 534 may be used to detect which parameters to assign to the set of stable context parameters and which parameters to assign to the set of exogenous context parameters. Once determined, some embodiments may then use the first prediction model 532 and second prediction model 536 to construct a combined model 538, where the combined model 538 may then be used by the electronic device 502 for further operations. In some embodiments, constructing the combined model 538 may include using additional data from older data 542 and user feedback 540 as training data.

FIG. 6 illustrates an example flowchart of a process 600 for detecting drift over multiple modes and modifying prediction models based on the detected drift, in accordance with an implementation. Some embodiments may determine an association between a first context parameter of a first mode and a first prediction model of a second mode, as indicated by block 602. Some embodiments may determine an association between a first context parameter of a first mode and a first prediction model of a second mode by determining an association between a first context parameter of the first mode and a second context parameter of the second mode, where the second context parameter is mapped or otherwise associated with the second model. For example, a computer system may analyze audio data captured by a microphone to extract relevant text and identify context parameters, such as "stress," which can be used for further processing. The system then receives text data via a user interface and detects another context parameter, "urgent," which frequently co-occurs with "stress" within the same time period. Furthermore, the computer system may have previously mapped "urgent" to a prediction model associated with "stress." Based on a determination that co-occurrence occurs at a rate greater than correlation threshold (e.g., greater than 50%, greater than 75%, greater than 90%, etc.), the computer system may associate the context parameter "stress" from the audio mode with the prediction model, where outputs of the prediction model may indicate for messaging vulnerabilities.

Some embodiments may detect patterns that recognize specific types of shifts over a monitored period. For example, some embodiments may detect relationships between a context parameter detected in audio mode representing a detected speech pattern (e.g., detecting an unrecognized speech pattern in an audio call) and determine that this has a downstream effect in increased likelihood to be susceptible to closing an account or otherwise stopping interaction based on receiving a verification test message. As an alternative example, some embodiments may detect relationships between a pandemic-related context parameter detected in audio mode (e.g., hearing the phrase "COVID" repeatedly in an audio call) and determine that this has a downstream effect in increased interest in small-cap assets for a broker application. These learned patterns can then be used to pre-activate or prioritize contextual features in models that have not yet observed the shift directly. For example, after detecting the parameter "speech pattern 3," some embodiments may modify a prediction model from a default prediction to a second prediction for UI inputs into a text mode for an on-device application. By determining correlation parameters and constructing associations between context parameters, the system can enhance the accuracy of its predictions, ensuring that it responds appropriately to different contexts. Additionally, selecting prediction models based on these associations can improve the system's adaptability, allowing it to dynamically adjust its configurations based on changing context parameters.

Some embodiments may determine a correlation parameter between a first context parameter and a second context parameter based on a count of events characterized by the first context parameter being determined and the second context parameter being determined within a same predefined time interval. For instance, a computer system may calculate a correlation parameter by counting the number of times both context parameters are determined within a one-hour period. Some embodiments may then determine a result indicating whether the correlation parameter satisfies a threshold. For example, a computer system may check if the correlation parameter meets a predefined threshold indicating that the first and second parameters are co-occurring at a rate of 75% within a measured period. Some embodiments may then construct an association between the first context parameter and the second context parameter by determining that the correlation parameter satisfies the threshold, where the second candidate context is mapped to or is otherwise associated with a first prediction model. Based on this association, some embodiments may then trigger a switch to the first prediction model when detecting the first context parameter.

Some embodiments may detect recurring patterns of context parameters over time and use the detected patterns to pre-determine models or pre-arrange training operations for prediction models. Some embodiments may involve detecting a candidate sequence of recurring context variables comprising the first context parameter and a subsequent second context. Some embodiments may involve detecting a plurality of instances indicating the candidate sequence of recurring context variables. Some embodiments may involve determining a schedule of context based on the plurality of instances, wherein the schedule of context variables comprises the first context parameter associated with a first time interval in the schedule of contexts. Some embodiments may involve receiving a third input causing a selection of the first prediction model in response to the third input being provided during the first time interval. For instance, a computer system may detect a candidate sequence of recurring context variables, such as a sequence of detected topics "elderly," "account," and "IT help." The computer system may then detect multiple instances of this sequence and determine a schedule based on these instances. The schedule may include the user's location associated with a specific time interval. The system may then receive an input from the user during this time interval, causing the selection of a prediction model related to the user's activity. By detecting patterns, some embodiments may detect sophisticated user behaviors and appropriate responses that may otherwise go undetected.

Some embodiments use on-device language models to identify and track sequences of recurring context parameters that affect the determination of downstream prediction models behavior. These may be tied to seasonality, behavioral rhythms, or predictable state transitions in user goals or environments. Once such patterns are learned, the system can proactively switch between models or fine-tuned variants that are best aligned with a context parameter. Some embodiments may involve detecting a temporal pattern of shifts based on the shifts. Some embodiments may involve constructing a schedule based on the temporal pattern. Some embodiments may involve generating a future output prediction by determining that a context shift is predicted for a future period. Some embodiments may involve pre-configuring a model with a set of model parameters associated with the first context parameter before, or while, the future period occurs. For instance, a computer system may detect a temporal pattern of shifts in user behavior, such as changes in login times. The system may then construct a schedule based on this pattern, predicting future login times. The system may then pre-configure a model with parameters related to the user's login behavior before the predicted login times.

Some embodiments may determine a context parameter from first data using a language model via the first model, as indicated by block 604. Some embodiments may use an on-device language model to execute context categorization by first tokenizing input text obtained via a first mode and encoding these tokens into high-dimensional vector representations. These vectors are then processed through multiple transformer layers that employ self-attention mechanisms to capture intricate contextual relationships. The model further refines these representations via dense neural networks equipped with specialized classification heads, which map the encoded features to a predefined context parameter or predefined collection of context parameters. This process may involve applying softmax activation to produce probability distributions across potential categories. Some embodiments may further configure prediction thresholds, integrate confidence scoring mechanisms, or employ adapter modules for domain-specific optimization. For example, when processing the input "I'm worried our current firewall configuration leaves us vulnerable to zero-day exploits," the system might categorize this as "anxious" due to the detection of emotional language patterns and expressions of concern. As another example, some embodiments may obtain a video data of a user stating, "recent market volatility resembles COVID-related volatile periods," the system would likely categorize this as "pandemic" based on the temporal reference and language patterns associated with the impact of public health events on financial markets.

Some embodiments may receive a second input for a prediction model via a second mode, as indicated by block 608. A computer system can receive input for a prediction model via various modes. For example, some embodiments may receive inputs in a graphical user interface implemented by event-driven architectures that capture and process user interactions through components integrated with model-serving infrastructure. Some embodiments may apply data transformations, including normalization, encoding, and feature extraction, to conform to a prediction model's expected input format. For example, a network intrusion detection system might capture input when a security analyst types a log entry such as "multiple failed SSH authentication attempts from 193.27.14.55 targeting admin accounts at 30-second intervals" into a threat assessment field, where this input may trigger a prediction model to evaluate potential attack patterns and assign a threat score. Alternatively, a portfolio optimization platform may collect user-related parameters based on which buttons of multiple UI buttons are selected, where the selections may update a selection object that is submitted to a prediction model to indicate recommended entities to include in the portfolio.

Some embodiments may determine a first prediction model based on an association between the first context parameter and the first prediction model, as indicated by block 612. Some embodiments may detect shifts in context and update or switch models accordingly. For example, if a computer system detects a change in a user's voice tone indicating concern about economic conditions, it can activate a context parameter (e.g., "recession worry"). This context parameter can then be used to select a more relevant predictive model, such as one tuned for "recession worry."

Some embodiments may monitor how context parameters (e.g., parameters indicating an emotional tone, a topic trigger, or an environmental cue) affects model performance across domains like voice, text, and image and update prediction model parameters based on a result of the monitoring. Some embodiments may then modify parameters of a pre-configured prediction model to be equal to the set of model parameters mapped to a context parameter. Some embodiments may obtain a set of model configuration parameters by referencing a context map based on the first context parameter and the first mode. For instance, a computer system may reference a context map implemented as a database, where each record associates a set of model configuration parameters to a context parameter. Some embodiments may then obtain configuration parameters for a prediction model based on a context parameter derived from a user's audio input or the mode of input. Some embodiments may determine the first prediction model by configuring an initial model to construct the first prediction model based on the set of model configuration parameters. For example, a computer system may configure a logistic regression model by adjusting the regularization strength parameter from 1.0 to 0.8 and changing the penalty type from L1 to L2 and retrain a model and then use the parameters of the retrained model in lieu of an original model or alternative prediction models.

Some embodiments may determine a result indicating whether the first context parameter is associated with a category indicating that the first context parameter is temporary. For example, a computer system may derive the context parameter "LA wildfire" based on a user input in an audio mode. The computer system may then determine a result indicating that "LA wildfire" is temporary. Some embodiments may then prevent the selection of an alternative prediction model in lieu of a default model or other alternative prediction models used to generate a first prediction for a text input based on this first result. Alternatively, a computer system may derive the context parameter "cancer" based on data provided in a video mode. The computer system may then determine a result indicating that "cancer" is not temporary. In response, some embodiments may determine an alternative model in lieu of the default model to generate a second prediction for the text input based on this alternative result. For example, whereas the first prediction may have indicated that a device or a user of the device was not vulnerable to a message of a first type, the second prediction may indicate that the device or user of the device is vulnerable to the message of the first type.

Some embodiments may determine the first prediction model by retrieving a set of adapter neural networks mapped to the first context parameter. For example, a computer system may retrieve neural networks associated with a context parameter derived from user input. Some embodiments may then configure the prediction model to use a set of adapter neural network nodes. For example, a computer system may configure a prediction model to use a set of adapter neural network nodes that are inserted between pre-trained transformer layers, allowing for efficient fine-tuning without modifying the original model architecture.

These adapter nodes may create small bottleneck structures that contain significantly fewer parameters than the full model, enabling task-specific customization of large language models where only the adapter parameters are updated during training while the base model weights remain frozen, thus reducing computational requirements while preventing catastrophic forgetting during training operations. The computer system may then retrieve adapter node model parameters associated with a context parameter derived from user input and configure a prediction model to use a base model combined with the retrieved adapter node model parameters.

Some embodiments may determine the first prediction model by performing a retraining operation on a previous model based on a set of responses to previous messages stored in the first electronic device. For instance, a computer system may fine-tune a previous model using responses to messages stored on the device. Some embodiments may perform a retraining operation on a previous model based on a set of responses to previous messages stored in the first electronic device to determine the first prediction model. For example, a computer system may fine-tune a previous model using stored responses to messages to create the first prediction model. For instance, a computer system may fine-tune a previous model using responses to messages stored on the device and create the first prediction model based on this retraining operation.

Some embodiments may prioritize or defer modalities based on cross-domain evidence of emerging user context. Some embodiments may obtain data in multiple modalities, such as obtaining audio data via an audio modality and obtaining text data via a text input modality. Some embodiments may generate an output prediction by determining, using an on-device language model, a second context parameter based on a first input. For instance, a computer system may determine a second context parameter derived from user input. Some embodiments may then obtain or otherwise determine a first modality weight associated with data received via the audio mode and a second first modality weight associated with data received via the text mode. Some embodiments may then determine a comparison result indicating that the first modality weight associated with the first mode outweighs a second modality weight associated with the second mode. For example, a computer system may compare a first modality weight equal to 0.7 with a second modality weight equal to 0.3 and determine that the first modality weight is greater and thus outweighs the second modality weight. It should be understood that modality weights may be bound within different numeric ranges (e.g., between zero and 1.0, between −1.0 and positive 1.0, between two other numbers, etc.), different categories, etc. Based on the determination that the first modality weight outweighs the second modality weight, some embodiments may then select a prediction model for inputs received via a third mode or otherwise determine a prediction model for the inputs. By determining modality weights and comparing them, a system can enhance the accuracy of systems using modality-triggered prediction models. Additionally, selecting prediction models based on these comparisons can improve a system's adaptability, allowing the system to dynamically adjust its configurations based on changing input modalities.

Some embodiments may suppress redundant adaptation when a shift in one domain is already captured by another. For example, some embodiments may detect, via the on-device language model, a previous context parameter based on an earlier input and a later context parameter based on a later input. In some embodiments, both context parameters, even if different, may map to the same downstream prediction model or be sufficiently similar to the same downstream prediction model. In response to detecting this similarity, some embodiments may then ignore operations to further change a previously selected model or selected set of model parameters. For example, a computer system may identify a previous context parameter from user input and determine a previous instance of a trained neural network mapped to the previous context parameter. Some embodiments may then determine that a similarity between the previous model parameters of the previous instance and the parameters of a later model are identical or even sufficiently similar as to satisfy a similarity threshold. For example, a computer system may compare the previous model with the later model and check if their similarity meets a predefined threshold with respect to either being the same model or having their respective parameters be sufficiently similar to each other. For example, some embodiments may determine that two models are sufficiently similar if the two models have the same architecture, and the weights of each model are within some threshold percentage of each other. If this similarity is sufficient, some embodiments may then generate an output prediction using the previous model.

Some embodiments may apply different agents in series to determine a prediction model for use. For example, a computer system may obtain an indication that, based on a video or audio input, a context parameter shift is detected using an on-device language model. In response, some embodiments may apply a series of agentic models to detect different aspects of the shift. The computer system may then apply a first agentic model to identify a magnitude of a shift (e.g., as measured in a semantic latent space between a previous context parameter and a later context parameter) and the topic shift. The computer system may then apply a second agentic model to identify one or more recurring context parameter patterns. The computer system may then apply a fourth agentic model to select one or more prediction models for downstream operations.

Some embodiments may generate an output prediction by providing a prediction model with a second input, as indicated by block 618. Some embodiments may generate an output prediction indicating a message type by providing the prediction model with the second input. For example, a computer system analyzes audio data captured by a microphone to extract relevant text and identify context parameters, such as "stress." The computer system may then determine a prediction model based on "stress" by selecting a baseline neural network and then an adapter neural network layer associated with "stress" to construct a prediction model. The computer system may then provide the constructed prediction model with a text sequence input that indicates user-related information and a user's request for information to output a prediction. In some embodiments, this output may indicate that the device may be compromised and should be sent a message of the message type "security check."

Some embodiments identify stable contextual variables-features that remain predictive across different shifts, tasks, or user segments. These variables may serve as anchors for adaptation, enabling cross-domain knowledge transfer from models trained on older data distributions or in related domains. While the specific stable features may vary across tasks, they provide reliable signals during periods of change. For instance, behavioral cues or external indicators, such as sentiment toward market volatility, may remain robust across both financial and health domains, offering continuity when user preferences shift. Outputs from models trained to handle particular drifts—as well as those currently experiencing them—can be fed into a meta-adaptive layer that surfaces shared or invariant features.

Some embodiments may detect a set of stable contextual variables by determining a first set of features that remain associated with particular models or outcomes across different concept switches. For example, a computer system may identify stable context parameters that consistently relate to a first prediction model despite changes in other context parameters over time. Some embodiments may detect a set of exogenous contextual variables by determining a second set of features that vary across different concept switches. For example, a computer system may identify environmental variables such as "pandemic" or "Norwegian" that change with different contexts. Some embodiments may train the prediction model by training a first subset of model layers based on the set of stable contextual variables and training a second subset of model layers based on the set of exogenous contextual variables. A computer system may then train one subset of model layers using stable context parameters as a default prediction model and train another subset using environmental context parameters that may change over time. For example, the computer system may determine that the same context parameters are assigned to a first set of voice inputs over a time period and that, in this same time period, a first set of user interface elements were selected. Some embodiments may train a first prediction model to predict the selection of this first set of user interface elements. The computer system may then determine that a different set of context parameters are assigned to a second set of voice inputs in addition to the first set of context parameters over a second time period and that, in this second time period, a second set of user interface elements were selected. Some embodiments may train a set of adapter layers having neural network layers for use in a second prediction model to predict the selection of this second set of user interface element, where this second prediction model includes the first prediction model. The computer system may then map the first set of context parameters to the first prediction model and map the second set of context parameters to the second prediction model or the set of adapter layers of the second prediction model.

Some embodiments may receive a user interaction with a user interface element associated with the first message. For instance, a computer system may detect a user clicking a button related to the first message. Some embodiments may send a response message associated with the first message to a server based on the user interaction. For example, a computer system may send a response message to a server when the user clicks the button. Some embodiments may cause the creation of a new user account based on the response message. For instance, a computer system may create a new user account on the server when the response message is received.

Some embodiments may present a message of the message type, as indicated by block 620. In some embodiments, a computer system may already store a message of a message type on the device, where determining a prediction for the message type may cause the computer system to retrieve and then present the message stored in the local memory of the device. For example, a client device may have previously stored a message reciting "identity deviation detected, please verify through verification step" in a local memory and, based on a prediction model output, present the message on a screen of the device.

In some embodiments, in response to determining an output prediction indicating vulnerability to a message type, a client device may send a message to a server indicating the message type. The server may then send a message of that message type to the client device. For example, in response to receiving a request indicating an authentication message type, the server may send an authentication challenge message to the client device, requiring a user of the client device to respond with proper credentials and demonstrating the device's ability to handle secure login protocols correctly. Alternatively, or additionally, in response to receiving a message type indicating "1" to represent "malformed packet," a server may send a malformed test packet to evaluate how the client device handles unexpected or potentially malicious inputs. Alternatively, or additionally, in response to receiving a message type indicating "VM" to represent "volatile marketing," a server may send a marketing test message to a user device (e.g., via e-mail, in-app communication, in-app recommendation, etc.) to evaluate how a user responds to receiving the marketing test message.

Some embodiments may transmit a prediction model to a second device, as indicated by block 622. Some embodiments may distribute training results via a federated network. For example, a client computer may send entire prediction models, a portion of the model parameters of the prediction models, or associations with context parameters to other client devices. Some embodiments may perform such operations as part of a federated learning model. Some embodiments may involve a first client device, such as a smartphone, transmitting a trained neural network prediction model to a server of federated system for aggregation. Alternatively, a first device may send, to a second client device, a set of adapter node weights in lieu of both base model node weights and adapter model node weights. Furthermore, some embodiments may transmit an association between a context parameter and a prediction model to a second device. For example, some embodiments may send a key-value pair associating the context parameter "suspicious" with a prediction model labeled "suspicious message test."

Some embodiments may perform additional downstream operations as a result of receiving a user interaction with a UI element associated with a message received by a client device. For example, after a server sends a message of an indicated message type to a client device, the client device may present the message in association with a confirmation screen (e.g., a phishing test message asking a user to confirm sending funds). The client device may send a response message associated with the server-sent message back to the server, where the server may then indicate that the user responded to the phishing test message. For example, the server may create a new user account or update a user account to indicate that the user had responded to the phishing test message.

FIG. 7 discloses a computing environment in which aspects of the present disclosure may be implemented. A computing environment 700 includes a set of computers 710, where the set of computers 710 may include one or more virtual or physical computers that individually or in cooperation achieve tasks, such as implementing one or more aspects described herein. The set of computers 710 have components that cooperate to cause output based on input. The set of computers 710 include desktops, servers, mobile devices (e.g., smart phones and laptops), payment terminals, wearables, virtual/augmented/expanded reality devices, spatial computing devices, virtualized devices, other computers, or combinations thereof. In particular example implementations, the computing environment 700 includes at least one physical computer.

The computing environment 700 may specifically be used to implement one or more aspects described herein. In some examples, one or more of the set of computers 710 may be implemented as a user device, such as a mobile device, and others of the set of computers 710 may be used to implement aspects of a machine learning framework usable to train and deploy models exposed to the mobile device or provide other functionality, such as through exposed application programming interfaces.

The computing environment 700 can be arranged in any of a variety of ways. In some embodiments, one or more computers of the set of computers 710 can be local to or remote from other computers of the set of computers 710 of the computing environment 700. In some embodiments, the set of computers 710 may be arranged according to client-server models, peer-to-peer models, edge computing models, other models, or combinations thereof.

In many examples, the set of computers 710 are communicatively coupled with devices internal or external to the computing environment 700 via a network 790. The network 790 is a set of devices that facilitate communication from a sender to a destination, such as by implementing communication protocols. Example network 790 include local area networks, wide area networks, intranets, or the Internet.

In some implementations, the set of computers 710 can be general-purpose computing devices (e.g., consumer computing devices). In some instances, via hardware or software configuration, the set of computers 710 can be special purpose computing devices, such as servers able to practically handle large amounts of client traffic, machine learning devices able to practically train machine learning models, data stores able to practically store and respond to requests for large amounts of data, other special purpose computers, or combinations thereof. The relative differences in capabilities of different kinds of computing devices can result in certain devices specializing in certain tasks. For instance, a machine learning model may be trained on a powerful computing device and then stored on a relatively lower powered device for use.

In some embodiments, one or more computers of the set of computers 710 include one or more processors 712, memory 714, and one or more interfaces 718. Such components can be virtual, physical, or combinations thereof.

The one or more processors 712 are components that execute instructions, such as instructions that obtain data, process the data, and provide output based on the processing. The one or more processors 712 often obtain instructions and data stored in the memory 714. The one or more processors 712 can take any of a variety of forms, such as central processing units, graphics processing units, coprocessors, tensor processing units, artificial intelligence accelerators, microcontrollers, microprocessors, application-specific integrated circuits, field programmable gate arrays, other processors, or combinations thereof. In example implementations, the one or more processors 712 include at least one physical processor implemented as an electrical circuit. Examples of one or more processors 712 may include INTEL, AMD, QUALCOMM, TEXAS INSTRUMENTS, and APPLE processors.

The memory 714 is a collection of components configured to store instructions 716 and data for later retrieval and use. The instructions 716 can, when executed by the one or more processors 712, cause the execution of one or more operations that implement aspects described herein. In many examples, the memory 714 may be one or more non-transitory, machine-readable media, such as random-access memory, read-only memory, cache memory, registers, portable memory (e.g., enclosed drives or optical disks), mass storage devices, hard drives, solid state drives, other kinds of memory, or combinations thereof. In certain circumstances, memory may be transitory and may store information encoded in transient signals.

The one or more interfaces 718 are components that facilitate receiving input from and providing output to something external to the set of computers 710, such as visual output components (e.g., displays or lights), audio output components (e.g., speakers), haptic output components (e.g., vibratory components), visual input components (e.g., cameras), auditory input components (e.g., microphones), haptic input components (e.g., touch or vibration sensitive components), motion input components (e.g., mice, gesture controllers, finger trackers, eye trackers, or movement sensors), buttons (e.g., keyboards or mouse buttons), position sensors (e.g., terrestrial or satellite-based position sensors, such as those using the Global Positioning System), other input components, or combinations thereof (e.g., a touch sensitive display). The one or more interfaces 718 can include components for sending or receiving data from other computing environments or electronic devices, such as one or more wired connections (e.g., Universal Serial Bus connections, THUNDERBOLT connections, ETHERNET connections, serial ports, or parallel ports) or wireless connections (e.g., via components configured to communicate via radiofrequency signals, such as WI-FI, cellular, BLUETOOTH, ZIGBEE, or other protocols). One or more of the one or more interfaces 718 can facilitate connection of the computing environment 700 to a network 790.

The set of computers 710 can include any of a variety of other components to facilitate the performance of operations described herein. Example components include one or more power units (e.g., batteries, capacitors, power harvesters, or power supplies) that provide operational power, one or more buses to provide intra-device communication, one or more cases or housings to encase one or more components, other components, or combinations thereof.

A person of skill in the art, having benefit of this disclosure, may recognize various ways for implementing technology described herein, such as by using any of a variety of programming languages (e.g., a C-family programming language, PYTHON, JAVA, RUST, HASKELL, other languages, or combinations thereof), libraries (e.g., libraries that provide functions for obtaining, processing, and presenting data), compilers, and interpreters to implement aspects described herein. Example libraries include NLTK (Natural Language Toolkit) by Team NLTK (providing natural language functionality), PYTORCH by META (providing machine learning functionality), NUMPY by the NUMPY Developers (providing mathematical functions), and BOOST by the Boost Community (providing various data structures and functions), among others. Operating systems (e.g., WINDOWS, LINUX, MACOS, IOS, and ANDROID) may provide their own libraries or application programming interfaces useful for implementing aspects described herein, including user interfaces and interacting with hardware or software components. Web applications can also be used, such as those implemented using JAVASCRIPT or another language. A person of skill in the art, with the benefit of the disclosure herein, can use programming tools to assist in the creation of software or hardware to achieve techniques described herein, such as intelligent code completion tools (e.g., INTELLISENSE) and artificial intelligence tools (e.g., GITHUB COPILOT).

In some examples, large language models can be used to understand natural language, generate natural language, or perform other tasks. Examples of such large language models include CHATGPT by OPENAI, a LLAMA model by META, a CLAUDE model by ANTHROPIC, others, or combinations thereof. Such models can be fine-tuned on relevant data using any of a variety of techniques to improve the accuracy and usefulness of the answers. The models can be run locally on server or client devices or accessed via an application programming interface. Some of those models or services provided by entities responsible for the models may include other features, such as speech-to-text features, text-to-speech, image analysis, research features, and other features, which may also be used as applicable.

Machine Learning Framework

Figure 8:
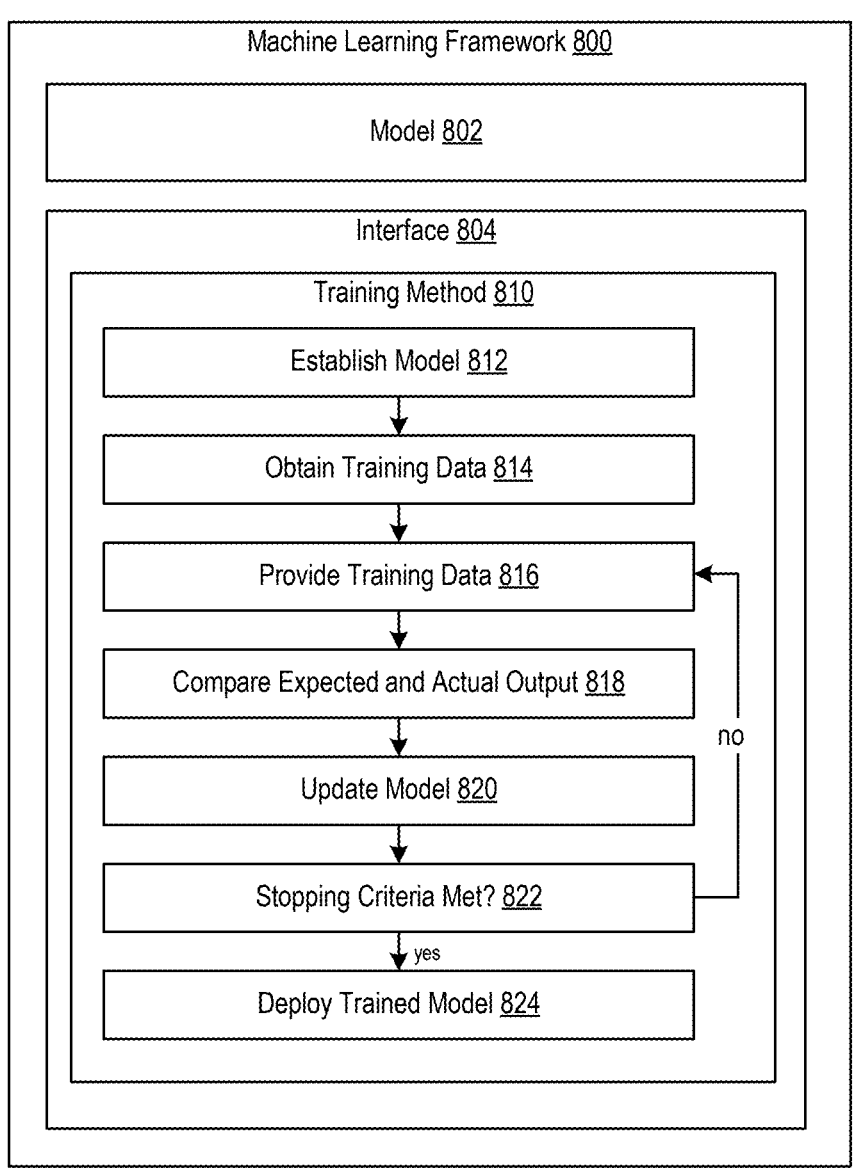

FIG. 8 illustrates an example machine learning framework that techniques described herein may benefit from. A machine learning framework 800 is a collection of software and data that implements artificial intelligence trained to provide output, such as predictive data, based on input. Examples of artificial intelligence that can be implemented with machine learning ways include neural networks (e.g., graph neural networks), language models (including so-called "large language models"), generative models, natural language processing models, adversarial networks, decision trees, Markov models, support vector machines, genetic algorithms, others, or combinations thereof. A person of skill in the art, having the benefit of this disclosure, will understand that these artificial intelligence implementations need not be equivalent to each other and may instead select from among them based on the context in which they will be used. A machine learning framework 800 or components thereof are often built or refined from existing frameworks, such as TENSORFLOW by GOOGLE, INC. or PYTORCH by the PYTORCH community.

The machine learning framework 800 can include one or more versions of the model 802 that are the structured representation of learning and an interface 804 that supports use of the model 802. The model 802 can take any of a variety of forms. In many examples, the model 802 includes representations of nodes (e.g., neural network nodes, decision tree nodes, Markov model nodes, other nodes, or combinations thereof) and connections between nodes (e.g., weighted or unweighted unidirectional or bidirectional connections). In certain implementations, the model 802 can include a representation of memory (e.g., providing long short-term memory functionality). Where the set includes multiple versions of the model 802, the multiple versions of the model 802 can be linked, cooperate, or compete to provide output.

The interface 804 can include software procedures (e.g., defined in a library) that facilitate the use of the model 802, such as by providing a way to establish and interact with the model 802. For instance, the software procedures can include software for receiving input, preparing input for use (e.g., by performing vector embedding, such as using Word2Vec, BERT, or another technique), processing the input with the model 802, providing output, training the model 802, performing inference with the model 802, fine-tuning the model 802, other procedures, or combinations thereof.

In an example implementation, interface 804 can be used to facilitate a training method 810 that can include operation 812. Operation 812 includes establishing a model 802, such as initializing a model 802. The establishing operation can include setting up the model 802 for further use (e.g., by training or fine tuning). The model 802 can be initialized with values. In examples, the model 802 can be pretrained. Operation 814 can follow operation 812. Operation 814 includes obtaining training data. In many examples, the training data includes pairs of input and desired output given the input. In supervised or semi-supervised training, the data can be prelabeled, such as by human or automated labelers. In unsupervised learning, the training data can be unlabeled. The training data can include validation data used to validate the model 802 after the model 802 is trained. Operation 816 can follow operation 814. Operation 816 includes providing a portion of the training data to the model 802. This can include providing the training data in a format usable by the model 802. The machine learning framework 800 (e.g., via the interface 804) can cause the model 802 to produce an output based on the input. Operation 818 can follow operation 816. Operation 818 includes comparing the expected output with the actual output. In an example, this can include applying a loss function to determine the difference between expected and actual. This value can be used to determine how training is progressing. Operation 820 can follow operation 818. Operation 820 includes updating the model 802 based on the result of the comparison. This can take any of a variety of forms depending on the nature of the model 802. Where the model 802 includes weights, the weights can be modified to increase the likelihood that the model 802 will produce the correct output given an input. Depending on the model 802, backpropagation or other techniques can be used to update the model 802. Operation 822 can follow operation 820. Operation 822 includes determining whether a stopping criterion has been reached, such as based on the output of the loss function (e.g., actual value or change in value over time). In addition to, or instead, whether the stopping criterion has been reached can be determined based on a number of training epochs that have occurred or an amount of training data that has been used. In some examples, satisfaction of the stopping criterion can include If the stopping criterion has not been satisfied, the flow of the method can return to operation 814. If the stopping criterion has been satisfied, the flow can move to operation 824. Operation 824 includes deploying the model 802 for use in production, such as providing the model 802 with real-world input data and producing output data used in a real-world process. The model 802 can be stored in memory 714 of the set of computers 710 or distributed across memories of two or more computers of the set of computers 710 for production of output data (e.g., predictive data).

Application of Techniques

Techniques herein may be applicable to improving technological processes of a financial institution, such as technological aspects of actions (e.g., resisting fraud, entering loan agreements, transferring financial instruments, or facilitating payments). Although technology may be related to processes performed by a financial institution, unless otherwise explicitly stated, claimed inventions are not directed to fundamental economic principles, fundamental economic practices, commercial interactions, legal interactions, or other patent ineligible subject matter without something significantly more. As used in this disclosure, a random process may include a pseudorandom process that involves the use of one or more algorithms to generate pseudorandom values. A random process may also include a physics-based random process that involves the use of a physical measurement to generate a random value.

Where implementations involve personal or corporate data, that data can be stored in a manner consistent with relevant laws and with a defined privacy policy. In certain circumstances, the data can be decentralized, anonymized, or fuzzed to reduce the amount of accurate private data that is stored or accessible at a particular computer. The data can be stored in accordance with a classification system that reflects the level of sensitivity of the data and that encourages human or computer handlers to treat the data with a commensurate level of care.

Where implementations involve machine learning, machine learning can be used according to a defined machine learning policy. The policy can encourage the training of a machine learning model with a diverse set of training data. Further, the policy can encourage testing for, and correcting undesirable bias embodied in the machine learning model. The machine learning model can further be aligned such that the machine learning model tends to produce output consistent with a predetermined morality. Where machine learning models are used in relation to a process that makes decisions affecting individuals, the machine learning model can be configured to be explainable such that the reasons behind the decision can be known or determinable. The machine learning model can be trained or configured to avoid making decisions based on protected characteristics.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

In some embodiments, the operations described in this disclosure may be implemented in a set of processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on a set of non-transitory, machine-readable media, such as an electronic storage medium. Furthermore, the use of the term "media" may include a single medium or combination of multiple media, such as a first medium and a second medium. A set of non-transitory, machine-readable media storing instructions may include instructions included on a single medium or instructions distributed across multiple media. The processing devices may include one or more devices configured through hardware, firmware, and/or software to be specifically designed for the execution of one or more of the operations of the methods.

It should be noted that the features and limitations described in any one embodiment may be applied to any other embodiment herein, and a flowchart or examples relating to one embodiment may be combined with any other embodiment in a suitable manner, done in different orders, or done in parallel. Furthermore, not all operations of a flowchart need to be performed. In addition, the systems and methods described herein may be performed in real time. It should also be noted that the systems and/or methods described above may be applied to, or used in accordance with, other systems and/or methods.

In some embodiments, the various computer systems and subsystems illustrated in the figures may include one or more computing devices that are programmed to perform the functions described herein. The computing devices may include one or more electronic storages (e.g., a set of databases accessible to one or more applications depicted in the system 100), one or more physical processors programmed with one or more computer program instructions, and/or other components. For example, the set of databases may include a relational database such as a PostgreSQL™ database or MySQL database. Alternatively, or additionally, the set of databases or other electronic storage used in this disclosure may include a non-relational database, such as a Cassandra™ database, MongoDB™ database, Redis database, Neo4j™ database, Amazon Neptune™ database, etc.

The computing devices may include communication lines or ports to enable the exchange of information with a set of networks (e.g., a network used by the system 100) or other computing platforms via wired or wireless techniques. The network may include the internet, a mobile phone network, a mobile voice or data network (e.g., a 5G or Long-Term Evolution (LTE) network), a cable network, a public switched telephone network, or other types of communications networks or combination of communications networks. A network described by devices or systems described in this disclosure may include one or more communications paths, such as Ethernet, a satellite path, a fiber-optic path, a cable path, a path that supports internet communications (e.g., IPTV), free-space connections (e.g., for broadcast or other wireless signals), Wi-Fi, Bluetooth, near field communication, or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Each of these devices described in this disclosure may also include electronic storages. The electronic storages may include non-transitory storage media that electronically stores information. The storage media of the electronic storages may include one or both of (i) system storage that is provided integrally (e.g., substantially non-removable) with servers or client computing devices, or (ii) removable storage that is removably connectable to the servers or client computing devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). An electronic storage may store software algorithms, information determined by the processors, information obtained from servers, information obtained from client computing devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent the processing functionality of a plurality of devices operating in coordination. The processors may be programmed to execute computer program instructions to perform functions described herein of subsystems described in this disclosure or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems described herein is for illustrative purposes, and is not intended to be limiting, as any of the subsystems described in this disclosure may provide more or less functionality than is described. For example, one or more of subsystems described in this disclosure may be eliminated, and some or all of its functionality may be provided by other ones of subsystems described in this disclosure. As another example, additional subsystems may be programmed to perform some, or all of the functionality attributed herein to one of the subsystems described in this disclosure.

With respect to the components of computing devices described in this disclosure, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Further, some or all of the computing devices described in this disclosure may include a user input interface and/or user output interface (e.g., a display) for use in receiving and displaying data. In some embodiments, a display such as a touchscreen may also act as a user input interface. It should be noted that in some embodiments, one or more devices described in this disclosure may have neither user input interface nor displays and may instead receive and display content using another device (e.g., a dedicated display device such as a computer screen and/or a dedicated input device such as a remote control, mouse, voice input, etc.). Additionally, one or more of the devices described in this disclosure may run an application (or another suitable program) that performs one or more operations described in this disclosure.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

As used throughout this application, the words "can" or "may" are used in a permissive sense (i.e., meaning having the potential to), rather than the mandatory sense (i.e., meaning must). The words "include," "including," "includes," and the like mean including, but not limited to. As used throughout this application, the singular forms "a," "an," and "the" include plural referents unless the context clearly indicates otherwise. Thus, for example, reference to "an element" or "the element" includes a combination of two or more elements, notwithstanding the use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., a set of processors performing steps/operations A, B, C, and D) encompass all such attributes or functions being mapped to all such objects and subsets of the attributes or functions being mapped to subsets of the attributes or functions (e.g., both/all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors.

Additionally, as used in the specification, "a portion" refers to a part of, or the entirety (i.e., the entire portion), of a given item (e.g., data) unless the context clearly dictates otherwise. Furthermore, a "set" may refer to a singular form or a plural form, such that a "set of items" may refer to one item or a plurality of items.

Unless the context clearly indicates otherwise, statements that "each" instance of some collection has some property should not be read to exclude cases where some otherwise identical or similar members of a larger collection do not have the property (i.e., each does not necessarily mean each and every). Limitations as to the sequence of recited steps should not be read into the claims unless explicitly specified (e.g., with explicit language like "after performing X, performing Y") in contrast to statements that might be improperly argued to imply sequence limitations (e.g., "performing X on items, performing Y on the X'ed items") used for purposes of making claims more readable rather than specifying a sequence. Statements referring to "at least Z of A, B, and C," and the like (e.g., "at least Z of A, B, or C"), refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Furthermore, unless indicated otherwise, updating an item may include generating the item or modifying an existing item. Thus, updating a record may include generating a record or modifying the value of an already-generated value in a record.

Unless the context clearly indicates otherwise, ordinal numbers used to denote an item do not define the item's position. For example, an item that may be a first item of a set of items even if the item is not the first item to have been added to the set of items or is otherwise indicated to be listed as the first item of an ordering of the set of items. Thus, for example, if a set of items is sorted in a sequence from "item 1," "item 2," and "item 3," a first item of a set of items may be "item 2" unless otherwise stated.

These and other aspects and implementations are discussed in detail herein. The detailed description includes illustrative examples of various aspects and implementations and provides an overview or framework for understanding the nature and character of the claimed aspects and implementations. The drawings provide illustration and a further understanding of the various aspects and implementations and are incorporated in and constitute a part of this specification.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "computer device," "computing device," or "component" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order. The separation of various system components does not require separation in all implementations, and the described program components can be included in a single hardware or software product.

The phraseology and terminology used herein is for the purpose of description and should not be regarded as limiting. Any references to implementations or elements or acts of the systems and methods herein referred to in the singular may also embrace implementations including a plurality of these elements, and any references in plural to any implementation or element or act herein may also embrace implementations including only a single element. Any implementation disclosed herein may be combined with any other implementation or embodiment.

References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The foregoing implementations are illustrative rather than limiting for the described systems and methods. Scope of the systems and methods described herein is thus indicated by the appended claims, rather than the foregoing description, and changes that come within the meaning and range of equivalency of the claims are embraced therein.

EMBODIMENTS

The present techniques will be better understood with reference to the following enumerated embodiments.
Computing Environment
1. A method comprising: determining, using a first electronic device, a first context parameter based on a first input derived from audio data received via a first mode of the first electronic device; determining a first prediction model based on the first context parameter; providing, to the first prediction model, an input comprising a second input to obtain an output prediction; and presenting a message based on the output prediction.

2. A method comprising: determining, using a first electronic device, a first context parameter based on a first input derived from audio data received via a first mode of the first electronic device; receiving a second input for a prediction model via a second mode of the first electronic device; generating an output prediction by (1) determining a first prediction model by referencing an associative data structure that associates the first context parameter with the first prediction model and (2) providing, to the first prediction model, an input comprising the second input to obtain the output prediction; and based on the generating of the output prediction, presenting a first message of a message type associated with the output prediction on a display of the first electronic device, wherein a target interaction with the first electronic device after the presenting of the first message on the first electronic device causes the first electronic device to send a second message associated with the first message to a server.

3. A method comprising: determining, using an on-device language model executing on a first electronic device, a first context parameter based on text input derived from audio data received via an on-device audio receiver of the first electronic device; receiving, from a first user, a user-provided input via a text-based entry on a user interface screen of the first electronic device; generating, with the first electronic device, a first output prediction indicating message vulnerability for a message type that, if interacted with, compromises data accessible via the first electronic device or control of the first electronic device by (1) selecting a first prediction model in lieu of alternative prediction models by referencing an associative data structure associating parameters and prediction models with the first context parameter to select the first prediction model, and (2) providing, to the first prediction model, an input comprising the user-provided input to generate the first output prediction; in response to generating the first output prediction indicating the message vulnerability to the message type: presenting a first test message of the message type on a display of the first electronic device to test the message vulnerability of the first electronic device during later use of the first electronic device, wherein a target interaction with the first electronic device after the presenting of the first test message on the first electronic device causes the first electronic device to send a confirmation message indicating a first vulnerability status to a server; and transmitting a version of the first prediction model to a second electronic device in a federated learning network with the first electronic device without requiring the second electronic device to independently perform training to obtain the version of the first prediction model, wherein the second electronic device is caused to generate a second output prediction indicating the message vulnerability to the message type for the second electronic device using the first prediction model, and wherein the second electronic device presents a second test message of the message type to test device vulnerability in response to generating the second output prediction.

4. A method comprising: determining, using an on-device language model executing on a first electronic device, a first context parameter based on a first input derived from first data received via a first mode of the first electronic device; receiving a second input for a prediction model via a second mode of the first electronic device; generating a first output prediction indicating message vulnerability for a message type by (1) determining a first prediction model in lieu of alternative prediction models based on an associative data structure associating the first context parameter with the first prediction model and (2) providing, to the first prediction model, an input comprising the second input to cause the first prediction model to generate the first output prediction; and based on the generating of the first output prediction: presenting a first message of the message type on a display of the first electronic device, wherein a target interaction with the first electronic device after the presenting of the first message on the first electronic device causes the first electronic device to send a second message indicating a vulnerability status to a server; and transmitting a version of the first prediction model to a second electronic device, wherein the second electronic device is caused to generate a second output prediction indicating the message vulnerability to the message type.

5. The method of any of the embodiments above, further comprising determining a result indicating whether the first context parameter is associated with a category indicating that the first context parameter is temporary, wherein generating the first output prediction comprises generating the first output prediction based on the result indicating whether the first context parameter is associated with the category indicating that the first context parameter is temporary.

6. The method of any of the embodiments above, further comprising: determining a second context parameter based on the user-provided input; determining a correlation parameter between the first context parameter and the second context parameter based on a count of events characterized by the first context parameter being determined and the second context parameter being determined within a same predefined time interval; determining a result indicating whether the correlation parameter satisfies a threshold; and constructing an association between the first context parameter and the second context parameter based on the result indicating whether the correlation parameter satisfies the threshold, wherein determining the first prediction model comprises selecting the first prediction model based on the association between the first context parameter and the second context parameter.

7. The method of any of the embodiments above, wherein generating the first output prediction comprises: determining, using the on-device language model, a second context parameter based on the first input; determining a first modality weight associated with data received via the first mode; and determining a comparison result indicating that the first modality weight associated with the first mode outweighs a second modality weight associated with the second mode, and wherein selecting the first prediction model comprises selecting the first prediction model based on the comparison result.

8. The method of any of the embodiments above, further comprising: detecting, via the on-device language model, a previous context parameter based on the first input; determining a previous model mapped to the previous context parameter, wherein generating the first output prediction comprises: determining a result indicating whether a similarity between the previous model and the first prediction model satisfies a threshold; and generating the first output prediction based on the result.

9. The method of any of the embodiments above, further comprising: obtaining a set of model configuration parameters by referencing a context map based on the first context parameter and the first mode; and determining the first prediction model comprises configuring an initial model to construct the first prediction model based on the set of model configuration parameters.

10. The method of any of the embodiments above, wherein determining the first prediction model comprises: retrieving a set of adapter neural networks mapped to the first context parameter; and configuring the prediction model to use a set of adapter neural network nodes.

11. The method of any of the embodiments above, wherein determining the first prediction model comprises performing a retraining operation on a previous model based on a set of responses to previous messages stored in the first electronic device to determine the first prediction model.

12. The method of any of the embodiments above, further comprising: detecting a set of stable contextual variables by determining a first set of features that remain associated with particular models or outcomes across different context parameter switches; detecting a set of exogenous contextual variables by determining a second set of features that vary across different context parameter switches; and training the prediction model by: training a first subset of model layers based on the set of stable contextual variables; and training a second subset of model layers based on the set of exogenous contextual variables.

13. The method of any of the embodiments above, further comprising, based on the user interaction, sending a response message associated with the target message to the server, wherein the response message causes a creation of a new user account.

14. The method of any of the embodiments above, further comprising: detecting a candidate sequence of recurring context variables comprising the first context parameter and a subsequent second context; detecting a plurality of instances indicating the candidate sequence of recurring context variables; determining a schedule of context based on the plurality of instances, wherein the schedule of context variables comprises the first context parameter associated with a first time interval in the schedule of contexts; and receiving a third input causing a selection of the first prediction model in response to the third input being provided during the first time interval.

15. The method of any of the embodiments above, further comprising: detecting a temporal pattern of shifts based on the shifts; constructing a schedule based on the temporal pattern; and generating a future output prediction by: determining that a context shift is predicted for a future period; and pre-configure a model with a set of model parameters associated with the first context parameter before or while the future period occurs.

16. The method of any of the embodiments above, further comprising determining a result indicating whether the first context parameter is associated with a category indicating that the first context parameter is temporary, wherein generating the output prediction comprises generating the output prediction based on the result indicating whether the first context parameter is associated with the category indicating that the first context parameter is temporary.

17. A tangible, non-transitory, machine-readable medium storing instructions that, when executed by a data processing apparatus, cause the data processing apparatus to perform operations comprising those of any of embodiments 1-16.

18. A system comprising one or more processors; and memory storing instructions that, when executed by the processors, cause the processors to effectuate operations comprising those of any of embodiments 1-16.

19. A system comprising means for performing any of embodiments 1-16.

What is claimed is:

1. A system comprising:
at least one processor; and
memory storing instructions that, when executed by the at least one processor, cause the system to:
   receive first input data via a first data modality on a first electronic device;
   determine, using an on-device language model, at least one first context parameter from the first input data;
   correlate the first context parameter with second context parameters detected from a second, different data modality;
   configure a prediction model for processing subsequent input based on the correlation between the first context parameter and the second context parameters, wherein configuring the prediction model comprises selecting the prediction model from a plurality of pr-diction models stored in an on-device model database by referencing an associative data structure that maps the correlated context parameters to the prediction model, wherein the first context parameter determined from the first data modality is used to select the prediction model for processing input received via the second data modality; and
   generate an output by providing further input to the configured prediction model, and present, based on the output, a message or indication via a user interface of the first electronic device.

2. The system of claim 1, wherein the memory stores a data structure mapping co-occurring context parameters from the first and second data modalities to one or more prediction models.

3. The system of claim 1, wherein the first data modality comprises audio and the second data modality comprises text.

4. The system of claim 1, wherein configuring the prediction model comprises assigning modality weights to the received data and selecting the prediction model based on a comparison of the modality weights.

5. The system of claim 1, further comprising:
in response to determining that a previously configured prediction model remains suitable based on a similarity threshold, suppressing reconfiguration of the model.

6. The system of claim 1, wherein configuring the prediction model comprises retrieving and applying adapter neural network modules associated with the correlated context parameters.

7. The system of claim 1, wherein the context parameters are distinguished as stable or exogenous variables, and the prediction model is accordingly trained with different subsets of model layers.

8. The system of claim 1, further comprising transmitting a mapping between the correlated context parameters and the prediction model to a second electronic device in a federated learning network.

9. The system of claim 1, further comprising:

detecting a recurring sequence of context parameters, and preemptively configuring the prediction model based on detecting an expected recurrence of the sequence.

10. The system of claim 1, wherein presenting the message comprises retrieving a message of a predefined type from local device memory and displaying the message to the user, wherein user interaction with the message is used as an indicator of device vulnerability.

11. A method comprising:

receiving, by a first electronic device, first input via a first data modality;

determining, using an on-device language model, at least one first context parameter from the first input;

correlating the first context parameter with a second context parameter detected from data received via a second, different data modality;

configuring a prediction model based on the correlation between the context parameters, wherein configuring the prediction model comprises selecting the prediction model from a plurality of prediction models stored in an on-device model database by referencing an associative data structure that maps the correlated context parameters to the prediction model, wherein the first context parameter determined from the first data modality is used to select the prediction model for processing input received via the second data modality;

providing an input to the selected or configured prediction model to obtain an output; and causing a user interface of the first electronic device to present a message or output based on the output.

12. The method of claim 11, wherein correlating includes tracking co-occurrence frequency within a temporal window and updating a mapping structure when a correlation threshold is satisfied.

13. The method of claim 11, wherein configuring the prediction model further comprises assigning modality weights, and configuring a model based on a comparison of such weights.

14. The method of claim 11, further comprising detecting recurring patterns in context parameter sequences and adjusting model selection in anticipation of future input periods.

15. The method of claim 11, wherein the message presented is a security-related test message, and the method further comprises receiving a user interaction with the message and updating a user vulnerability status based on the interaction.

16. The method of claim 11, wherein the correlation between context parameters is used to suppress redundant adaptation of the prediction model if a currently configured model remains within a predefined similarity threshold.

17. A non-transitory computer-readable medium storing instructions that, when executed by at least one processor, cause the processor to perform operations comprising:

receiving, on an electronic device, a first input via a first data modality;

determining at least one first context parameter using an on-device language model;

correlating the first context parameter with a second context parameter derived from a different data modality;

selecting a prediction model from a plurality of prediction models stored in an on-device model database by referencing an associative data structure that maps the correlated context parameters to the prediction model, wherein the first context parameter determined from the first data modality is used to select the prediction model for processing input received via the second data modality;

A generating an output with the prediction model; and presenting, via a user interface, a message representing the output.

18. The non-transitory computer-readable medium of claim 17, further comprising instructions to:

store and update an association structure that maps context parameter correlations to prediction model configurations.

19. The non-transitory computer-readable medium of claim 17, wherein the operations further comprise:

detecting reoccurring context parameter sequences over time and adapting prediction model selection accordingly.

20. The non-transitory computer-readable medium of claim 17, further comprising instructions to transmit an association structure to at least one other device in a federated arrangement.

* * * * *